US011126754B2

(12) United States Patent
Yu et al.

(10) Patent No.: US 11,126,754 B2
(45) Date of Patent: Sep. 21, 2021

(54) PERSONALIZED AND CRYPTOGRAPHICALLY SECURE ACCESS CONTROL IN OPERATING SYSTEMS

(71) Applicant: BicDroid Inc., Petersburg (CA)

(72) Inventors: Xiang Yu, Kitchener (CA); Jin Meng, Kitchener (CA); En-hui Yang, Petersburg (CA)

(73) Assignee: BICDROID INC., Petersburg (CA)

( * ) Notice: Subject to any disclaimer, the term of this patent is extended or adjusted under 35 U.S.C. 154(b) by 120 days.

(21) Appl. No.: 16/695,665

(22) Filed: Nov. 26, 2019

(65) Prior Publication Data

US 2020/0175208 A1 Jun. 4, 2020

Related U.S. Application Data

(60) Provisional application No. 62/773,524, filed on Nov. 30, 2018.

(51) Int. Cl.
*G06F 21/74* (2013.01)
*G06F 21/44* (2013.01)
(Continued)

(52) U.S. Cl.
CPC .............. *G06F 21/74* (2013.01); *G06F 21/44* (2013.01); *G06F 21/6218* (2013.01); *H04L 9/3236* (2013.01)

(58) Field of Classification Search
CPC ...... G06F 21/74; G06F 21/44; G06F 21/6218; H04L 9/3236; H04L 9/3263; H04L 9/3297
See application file for complete search history.

(56) References Cited

U.S. PATENT DOCUMENTS

| 2006/0053285 A1* | 3/2006 | Kimmel | H04L 9/3247 |
| | | | 713/166 |
| 2011/0213971 A1* | 9/2011 | Gurel | H04L 9/3271 |
| | | | 713/165 |

(Continued)

FOREIGN PATENT DOCUMENTS

WO    2017098024 A1    6/2017

OTHER PUBLICATIONS

Jang et al., "SeCReT: Secure Channel between Rich Execution Environment and Trusted Execution Environment", 2015 Network and Distributed System Security (NDSS) Symposium, Feb. 2015, pp. 1-15.

(Continued)

*Primary Examiner* — Nelson S. Giddins
(74) *Attorney, Agent, or Firm* — Bereskin & Parr LLP/S.E.N.C.R.L., s.r.l.

(57) ABSTRACT

An access control system includes a processor configured to provide a trusted execution environment isolated from a rich execution environment. A rich OS operates in the rich execution environment while a trusted OS operates in the trusted execution environment. A plurality of protected data files are stored in non-volatile memory. When a process requests access to a protected data file, the computer system can permit the requesting process to access the requested data file only if a validated application token is present that corresponds to the requesting process. An application token is generated for the associated application by: detecting initiation of a first process associated with the associated application; determining that a valid user code is available within the trusted execution environment; and generating the application token using the valid user code upon determining that the valid user code is available within the trusted execution environment.

20 Claims, 3 Drawing Sheets

(51) Int. Cl.
*G06F 21/62* (2013.01)
*H04L 9/32* (2006.01)

(56) References Cited

U.S. PATENT DOCUMENTS

| 2015/0143484 | A1* | 5/2015 | Violleau | H04L 63/0853 |
| | | | | 726/6 |
| 2016/0099950 | A1* | 4/2016 | Cuff | H04L 63/0838 |
| | | | | 726/7 |
| 2016/0253519 | A1* | 9/2016 | Broumas | G06F 21/6245 |
| | | | | 713/189 |
| 2017/0230187 | A1* | 8/2017 | Li | H04L 9/3247 |
| 2017/0344407 | A1 | 11/2017 | Jeon et al. | |

OTHER PUBLICATIONS

International Search Report and Written Opinion of the Searching Authority dated Sep. 26, 2019 in respect of PCT/CA2019/051032.
International Search Report and Written Opinion of the Searching Authority dated Feb. 18, 2020 in respect of PCT/CA/2019/051687.

* cited by examiner

PERSONALIZED AND CRYPTOGRAPHICALLY SECURE ACCESS CONTROL IN OPERATING SYSTEMS

CROSS-REFERENCE TO RELATED APPLICATION

This application claims the benefit of the U.S. Provisional Application No. 62/773,524, filed on Nov. 30, 2018, the entirety of which is incorporated herein by reference.

FIELD

The described embodiments relate to systems and methods for file access control, and in particular to systems and methods for managing access to protected data files in an operating system.

INTRODUCTION

The following is not an admission that anything discussed below is part of the prior art or part of the common general knowledge of a person skilled in the art.

In an increasingly digital world, data is one of the most important assets for people, corporations, and nations. As a result, extensive measures are taken to ensure the security of sensitive data. However, as hacking techniques become more and more sophisticated, data security challenges are increasingly daunting.

In any operating system, data security is critical. However, different operating systems may present different and unique challenges in providing data security. Operating systems designed for end-user flexibility and hardware compatibility may have difficultly ensuring data security. For example, more flexible mobile operating systems such as Android™ OS (which was originally designed for its flexibility for end users and compatibility with different types of hardware) are often considered to provide inferior data security as compared to other mobile operating systems such as iOS. At the same time, operating systems intended to provide strong data security may require complex or difficult system configurations and may interfere with system performance. As a result, users may loosen or disable some of the system protections to avoid complicated system configurations and/or to alleviate performance concerns.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

A computer system can be configured to provide personalized and cryptographically secure access control. The access control system can implement cryptographic techniques at multiple different stages of data access. The cryptographic techniques can include data encryption and establishing a personalized and cryptographically secure chain of trust from the end user, applications, framework, kernel, and to a trusted execution environment. Implementing the access control system with an operating system such as the Android™ operating system can help protect application data against known and unknown attacks including ransomware and phishing attacks on the framework level and/or through abusive exploration of the root privilege.

The access control system can include a kernel module that interacts with various components of the computer system to manage data access control. The kernel module can interact with framework utilities to collect attributes from applications and/or users. The kernel module can interact with a trusted application operating in the trusted execution environment for encryption key management. The kernel module may manage data structures in the kernel memory that can be used for process authentication and authorization. The kernel module can also control file system operations usable to access protected and encrypted data stored on the computer system.

In a broad aspect, there is provided an access control system for a computing device, the access control system comprising:

(a) a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment; and (b) a non-volatile storage memory configured to store a plurality of data files and a plurality of application instruction sets, wherein each application instruction set corresponds to an application installed on the computing device and each application is configured to operate within the rich operating system, and wherein the plurality of data files includes a plurality of protected data files;

(c) wherein the processor is configured to:
  (i) receive a file request for a requested file stored in the non-volatile storage memory, wherein the requested file corresponds to one of the protected data files in the plurality of protected data files, and wherein the file request is received from a requesting process operating within the rich operating system;
  (ii) determine an associated application associated with the requesting process, wherein the associated application corresponds to one of the applications installed on the computing device;
  (iii) determine whether a validated application token is present for the associated application; and
  (iv) permit the requesting process to access the requested data file only if the validated application token is present and otherwise prevent the requesting process from accessing the requested data file;
  wherein
    the processor is configured to generate the validated application token for the associated application by:
      detecting initiation of a first process associated with the associated application;
      determining that a valid user code is available within the trusted execution environment; and
      generating the application token using the valid user code upon determining that the valid user code is available within the trusted execution environment.

In any embodiment, the processor may be configured to generate an application initiation prompt in conjunction with the initiation of the first process, where the application initiation prompt is defined to prompt a user to input a user code; receive an application initiation input in response to the application initiation prompt; determine whether the application initiation input corresponds to the valid user code; and generate the application token using the user code upon determining that the application initiation input corresponds to the valid user code.

In any embodiment, determining whether the application initiation input corresponds to the valid user code may include: determining a received user code from the application initiation input; determining a hashed user code by hashing the received user code; comparing the hashed user code to a stored hashed user code stored within a trusted non-volatile storage memory of the trusted execution environment; and determining that the received user code corresponds to the valid user code when the hashed user code matches the stored hashed user code and otherwise determining that the received user code is invalid.

In any embodiment, the processor may be configured to generate the application token by: determining a time stamp corresponding to the initiation of the first process; and generating the application token using the time stamp and the valid user code.

In any embodiment, the processor may be configured to: associate each protected data file with a file-specific set of applications, where the file-specific set of applications includes at least one application installed on the computing device; and permit the requesting process to access the requested data file only if the associated application associated with the requesting process is one of the file-specific set of applications associated with the requested data file.

In any embodiment, the processor may be configured to: define a set of protected applications, where the set of protected applications includes at least one of the applications installed on the computing device; and permit the requesting process to access the requested data file only if the associated application is one of the protected applications.

In any embodiment, the processor may be configured to, for each new file generated by one of the protected applications, automatically store that file as one of the protected data files.

In any embodiment, for each application installed on the computing device, the processor may be configured to assign that application a unique application identifier, where the application identifier is defined using a unique application identification code that is defined by the processor and an application certificate corresponding to that application; and the processor can be configured to generate the application token for the associated application using the unique application identifier for the associated application and the valid user code.

In any embodiment, for each application installed on the computing device, the processor may be configured to define the application identifier by: generating a hashed application certificate by hashing the application certificate corresponding to that application; and combining the application identification code and the hashed application certificate.

In any embodiment, the processor may be configured to, upon initiation of the first process associated with the associated application, validate the application certificate corresponding to that associated application; generate a validated application initiation prompt in response to validating the application certificate, where the validated application initiation prompt is defined to prompt a user to input a user code; receive a validated application initiation input in response to the validated application initiation prompt; determine whether the validated application initiation input corresponds to the valid user code; and permit the associated application to execute only after the application certificate has been validated and the validated application initiation input corresponds to the valid user code.

In any embodiment, the processor may be configured to: for each application installed on the computing device, assign that application a unique application identifier, where the application identifier is defined using a unique application identification code that is defined by the processor and an application certificate corresponding to that application; define a set of protected applications, where the set of protected applications includes at least one of the applications installed on the computing device; define an access policy file, where the access policy files includes the unique application identifier of each protected application in the set of protected applications; store the access policy file in the non-volatile storage memory; and permit the requesting process to access the requested data file only if the unique application identifier of the associated application is included in the access policy file.

In any embodiment, the processor may be configured to: store the access policy file in the non-volatile storage memory in association with a hashed code corresponding to the valid user code; prevent modifications to the access policy file unless a policy modification input that corresponds to the valid user code is received and verified against the hashed code corresponding to the valid user code; and permit read operations to be performed on the access policy file in the absence of the policy modification input.

In any embodiment, the processor may be configured to: define an access policy data structure in a kernel memory accessible within the rich operating system; and synchronize the access policy data structure with the access policy file stored in the non-volatile storage memory such that the access policy data structure includes the unique application identifier of each protected application in the set of protected applications.

In any embodiment, the processor may be configured to, upon initiation of the first process associated with the associated application, validate the application certificate corresponding to the associated application; upon validating the application certificate, determine whether the associated application is one of the protected applications by: determining the unique application identifier of the associated application; and determining whether the unique application identifier of the associated application is included in the access policy data structure; and determining that the associated application is one of the protected application when the unique application identifier of the associated application is included in the access policy data structure, and otherwise determining that the associated application is an unprotected application; upon determining that the associated application is one of the protected applications, generate a protected application initiation prompt, where the protected application initiation prompt is defined to prompt a user to input a user code; receive a protected application initiation input in response to the protected application initiation prompt; determine whether the protected application initiation input corresponds to the valid user code; and permit the associated application to execute only after the processor has determined that the protected application initiation input corresponds to the valid user code; and upon determining that the associated application is an unprotected application, permit the associated application to execute. The processor may be configured to permit the associated application even in the absence of the user code upon determining that the associated application is an unprotected application.

In any embodiment, the processor may be configured to, upon initiation of the requesting process, determine a process identifier associated with the requesting process; validate the application certificate corresponding to the associated application; upon validating the application certificate, determine whether the associated application is one of the protected applications; upon determining that the associated application is one of the protected applications, generate a process initiation prompt, wherein the process initiation prompt is defined to prompt a user to input a user code; receive a process initiation input in response to the process initiation prompt; determine whether the process initiation input corresponds to the valid user code; upon determining that the associated application is one of the protected applications and that the process initiation input corresponds to the valid user code, store the process identifier of the requesting process in an authorized process data structure in a kernel memory accessible within the rich operating system; and permit the requesting process to access the requested data file only if the authorized process data structure includes the process identifier of the requesting process.

In any embodiment, the processor may be configured to: receive a write operation request from a particular process operating in the rich operating system, where the write operation request relates to a protected data file; and permit the write operation request to occur only if the authorized process data structure includes the process identifier of the particular process.

In any embodiment, the processor may be configured to: detect termination of a terminating process operating in the rich operating system; determine that the authorized process data structure includes the process identifier of the terminating process; and update the authorized process data structure to remove the process identifier of the terminating process.

In any embodiment, the processor may be configured to: store the access policy file in the non-volatile storage memory in association with a hashed code corresponding to the valid user code; receive a policy update input specifying a particular application to be added to the set of protected applications; generate an update verification prompt in response to the policy update input, where the update verification prompt is defined to prompt a user to input a user code; receive an update verification input in response to the update verification prompt; determine whether the update verification input corresponds to the valid user code using the hashed code corresponding to the valid user code stored in association with the access policy file; upon determining that the update verification input corresponds to the valid user code, update the access policy file to include the particular application; identify a set of existing data files corresponding to that particular application that are stored in the non-volatile storage memory; and modify each of the existing data files from an unprotected data file to become one of the protected data files.

In a broad aspect, there is provided a method of controlling access to a plurality of data files stored in a non-volatile storage memory of the computing device, wherein the plurality of data files includes a plurality of protected data files, the method performed using a processor configured to operate a rich operating system in a rich execution environment and a trusted operating system in a trusted execution environment, the method comprising:

(a) receiving, by the processor, a file request for a requested file stored in the non-volatile storage memory, wherein the requested file corresponds to one of the protected data files in the plurality of protected data files, and wherein the file request is received from a requesting process operating within the rich operating system;

(b) determining, by the processor, an associated application associated with the requesting process, wherein the associated application corresponds to one of the applications installed on the computing device;

(c) determining, by the processor, whether a validated application token is present for the associated application; and (d) permitting, by the processor, the requesting process to access the requested data file only if the validated application token is present and otherwise prevent the requesting process from accessing the requested data file;

wherein
the validated application token for the associated application is generated by the processor by:
detecting initiation of a first process associated with the associated application;
determining that a valid user code is available within the trusted execution environment; and
generating the application token using the valid user code upon determining that the valid user code is available within the trusted execution environment.

In any embodiment, the method may include: generating, by the processor, an application initiation prompt in conjunction with the initiation of the first process, where the application initiation prompt is defined to prompt a user to input a user code; receiving, by the processor, an application initiation input in response to the application initiation prompt; determining, by the processor, whether the application initiation input corresponds to the valid user code; and generating, by the processor, the application token using the user code upon determining that the application initiation input corresponds to the valid user code.

In any embodiment, determining whether the application initiation input corresponds to the valid user code can include: determining a received user code from the application initiation input; determining a hashed user code by hashing the received user code; comparing the hashed user code to a stored hashed user code stored within a trusted non-volatile storage memory of the trusted execution environment; and determining that the received user code corresponds to the valid user code when the hashed user code matches the stored hashed user code and otherwise determining that the received user code is invalid.

In any embodiment, the method may include generating the application token by: determining a time stamp corresponding to the initiation of the first process; and generating the application token using the time stamp and the valid user code.

In any embodiment, the method may include associating each protected data file with a file-specific set of applications, where the file-specific set of applications includes at least one application installed on the computing device; and permitting the requesting process to access the requested data file only if the associated application associated with the requesting process is one of the file-specific set of applications associated with the requested data file.

In any embodiment, the method may include defining a set of protected applications, where the set of protected applications includes at least one of the applications installed on the computing device; and permitting the requesting process to access the requested data file only if the associated application is one of the protected applications.

In any embodiment, the method may include for each new file generated by one of the protected applications, automatically storing that file as one of the protected data files.

In any embodiment, the method may include for each application installed on the computing device, assigning that application a unique application identifier, where the application identifier is defined using a unique application identification code that is defined by the processor and an application certificate corresponding to that application; and generating the application token for the associated application using the unique application identifier for the associated application and the valid user code.

In any embodiment, the method may include for each application installed on the computing device, defining the application identifier by: generating a hashed application certificate by hashing the application certificate corresponding to that application; and combining the application identification code and the hashed application certificate.

In any embodiment, the method may include, upon initiation of the first process associated with the associated application, validating the application certificate corresponding to that associated application; generating a validated application initiation prompt in response to validating the application certificate, where the validated application initiation prompt is defined to prompt a user to input a user code; receiving a validated application initiation input in response to the validated application initiation prompt; determining whether the validated application initiation input corresponds to the valid user code; and permitting the associated application to execute only after the application certificate has been validated and the validated application initiation input corresponds to the valid user code.

In any embodiment, the method may include for each application installed on the computing device, assigning that application a unique application identifier, where the application identifier is defined using a unique application identification code that is defined by the processor and an application certificate corresponding to that application; defining a set of protected applications, where the set of protected applications includes at least one of the applications installed on the computing device; defining an access policy file, where the access policy files includes the unique application identifier of each protected application in the set of protected applications; storing the access policy file in the non-volatile storage memory; and permitting the requesting process to access the requested data file only if the unique application identifier of the associated application is included in the access policy file.

In any embodiment, the method may include storing the access policy file in the non-volatile storage memory in association with a hashed code corresponding to the valid user code; preventing modifications to the access policy file unless a policy modification input that corresponds to the valid user code is received and verified against the hashed code corresponding to the valid user code; and permitting read operations to be performed on the access policy file in the absence of the policy modification input.

In any embodiment, the method may include defining an access policy data structure in a kernel memory accessible within the rich operating system; and synchronizing the access policy data structure with the access policy file stored in the non-volatile storage memory such that the access policy data structure includes the unique application identifier of each protected application in the set of protected applications.

In any embodiment, the method may include, upon initiation of the first process associated with the associated application, validating the application certificate corresponding to the associated application; upon validating the application certificate, determining whether the associated application is one of the protected applications by: determining the unique application identifier of the associated application; and determining whether the unique application identifier of the associated application is included in the access policy data structure; and determining that the associated application is one of the protected application when the unique application identifier of the associated application is included in the access policy data structure, and otherwise determining that the associated application is an unprotected application; upon determining that the associated application is one of the protected applications, generating a protected application initiation prompt, where the protected application initiation prompt is defined to prompt a user to input a user code; receiving a protected application initiation input in response to the protected application initiation prompt; determining whether the protected application initiation input corresponds to the valid user code; and permitting the associated application to execute only after the processor has determined that the protected application initiation input corresponds to the valid user code; and upon determining that the associated application is an unprotected application, permit the associated application to execute. The processor may be configured to permit the associated application even in the absence of the user code upon determining that the associated application is an unprotected application.

In any embodiment, the method may include, upon initiation of the requesting process, determining a process identifier associated with the requesting process; validating the application certificate corresponding to the associated application; upon validating the application certificate, determining whether the associated application is one of the protected applications; upon determining that the associated application is one of the protected applications, generating a process initiation prompt, where the process initiation prompt is defined to prompt a user to input a user code; receiving a process initiation input in response to the process initiation prompt; determining whether the process initiation input corresponds to the valid user code; upon determining that the associated application is one of the protected applications and that the process initiation input corresponds to the valid user code, storing the process identifier of the requesting process in an authorized process data structure in a kernel memory accessible within the rich operating system; and permitting the requesting process to access the requested data file only if the authorized process data structure includes the process identifier of the requesting process.

In any embodiment, the method may include receiving a write operation request from a particular process operating in the rich operating system, where the write operation request relates to a protected data file; and permitting the write operation request to occur only if the authorized process data structure includes the process identifier of the particular process.

In any embodiment, the method may include detecting termination of a terminating process operating in the rich operating system; determining that the authorized process data structure includes the process identifier of the terminating process; and updating the authorized process data structure to remove the process identifier of the terminating process.

In any embodiment, the method may include storing the access policy file in the non-volatile storage memory in association with a hashed code corresponding to the valid user code; receiving a policy update input specifying a particular application to be added to the set of protected applications; generating an update verification prompt in response to the policy update input, where the update verification prompt is defined to prompt a user to input a user code; receiving an update verification input in response to the update verification prompt; determining whether the update verification input corresponds to the valid user code using the hashed code corresponding to the valid user code stored in association with the access policy file; upon determining that the update verification input corresponds to the valid user code, updating the access policy file to include the particular application; identifying a set of existing data files corresponding to that particular application that are stored in the non-volatile storage memory; and modifying each of the existing data files from an unprotected data file to become one of the protected data files.

In a broad aspect, there is provided a computer-readable medium having stored thereon non-transitory computer readable instructions for controlling access to a plurality of data files stored in a non-volatile storage memory of the computing device comprising a processor configured to operate a rich operating system in a rich execution environment and a trusted operating system in a trusted execution environment, wherein the plurality of data files includes a plurality of protected data files, wherein the instructions are defined to configure the processor to:
  (a) receive a file request for a requested file stored in the non-volatile storage memory, wherein the requested file corresponds to one of the protected data files in the plurality of protected data files, and wherein the file request is received from a requesting process operating within the rich operating system;
  (b) determine an associated application associated with the requesting process, wherein the associated application corresponds to one of the applications installed on the computing device;
  (c) determine whether a validated application token is present for the associated application; and
  (d) permit the requesting process to access the requested data file only if the validated application token is present and otherwise prevent the requesting process from accessing the requested data file; wherein
    the instructions are defined to configure the processor to generate the validated application token for the associated application by:
      detecting initiation of a first process associated with the associated application;
      determining that a valid user code is available within the trusted execution environment; and
      generating the application token using the valid user code upon determining that the valid user code is available within the trusted execution environment.

In any embodiment, the computer-readable medium may further include instructions defined to configure the processor to perform any method described herein.

It will be appreciated by a person skilled in the art that a system, method or computer readable medium disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

The drawings included herewith are for illustrating various examples of articles, methods, and apparatuses of the teaching of the present specification and are not intended to limit the scope of what is taught in any way.

DESCRIPTION OF EXEMPLARY EMBODIMENTS

Figure 1:
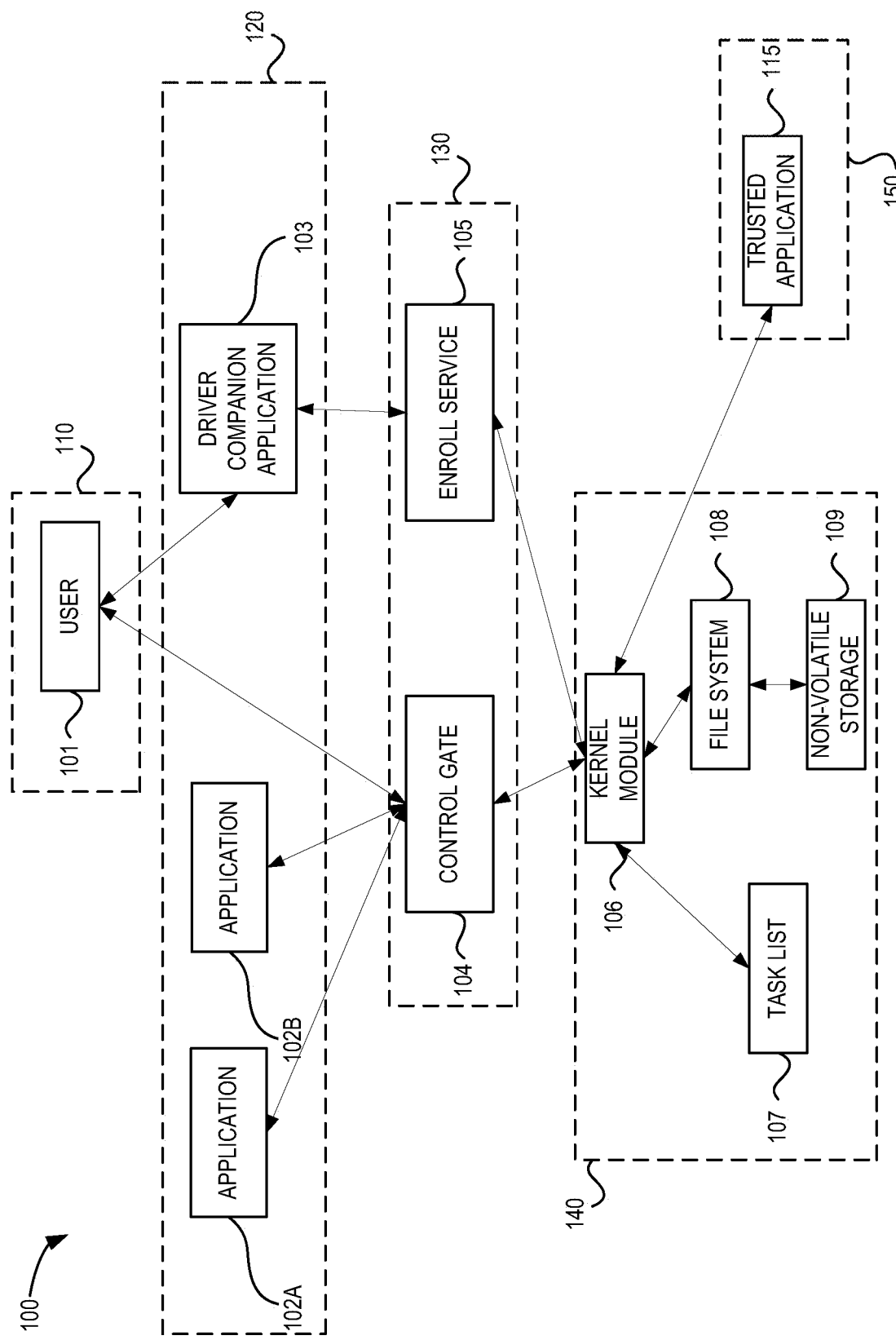
FIG. 1 is a block diagram illustrating a computer system in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

A computer program is a group of instructions that can be executed by a computer (i.e. by a processor). A process is an instance of a program, i.e. a copy of a program in computer memory that is ready to be executed by the computer's central processing unit(s) (CPUs). In the discussion that follows, reference is made to a processor of a computer system and operations performed by the processor of a computer system. It should be understood that such references encompass one or more processing elements and the use of one or more processing elements to perform operations, such as one or more processing cores within one or more CPUs.

An operating system (OS) is software (including several programs and libraries) that controls the use of hardware and software resources available to a computer. The core component of an OS, a kernel, is a program that manages all the computer hardware devices. At runtime, kernel processes instantiated from the kernel also manage processes instantiated from programs other than the kernel (e.g. programs initiated by a user) and provide unified interfaces (called system calls) for those non-kernel processes to access hardware devices.

Processors can be configured to distinguish instructions from the kernel and instructions from programs other than the kernel, and execute the instructions in separate modes, namely a kernel mode and a user mode. Processes instantiated within the operating system from programs other than the kernel (i.e. external to the kernel) may be referred to herein as user mode processes. The corresponding programs or application may be referred to as user mode applications.

Within the kernel, file systems are essential modules that provide user mode processes with access to non-volatile storage such as disks, flash memory, etc. From the perspective of a user mode process, the process accesses and operates (e.g. opens/reads/writes/closes) files on non-volatile storage by issuing system calls to the OS kernel. Upon receiving those system calls, the OS kernel manages if and how the requesting process can access the requested files. The OS kernel can perform access control by arbitrating whether the requesting process (the process issuing the system call) is allowed to access the targeted file or directory based on information regarding the issuer (requesting process) and targeted file, use the file system modules to fulfill the system call(s) if access is allowed, and notify user mode processes through return values of the system calls.

In general, data files are used to store information. When the information is stored in a directly readable/understandable manner (i.e. not obfuscated or otherwise coded to prevent direct understanding of the information), the data file may be referred to as being plaintext. In some cases, the data files may be modified (i.e. encrypted) to prevent unauthorized access to the plaintext information stored by that data file.

Encryption is a process that uses a secret (an encryption key) to transform the information (i.e. the plaintext) into an obfuscated form (which may be referred to as ciphertext). Decryption is the reverse process of encryption and uses a secret (e.g. the encryption key or a different decryption key depending on the encryption method used) to transform ciphertext to plaintext.

In some cases, file systems (such as the ext4 file system and the NTFS file system) may support file system-level encryption for data files stored in the computer system. In file system-level encryption, the encryption/decryption of data in individual data files can be performed by the file system. The system can define encryption policies related to the stored files (including whether a file has been or should be encrypted and how encryption key(s) is/are derived) on an individual basis (i.e. on a per-file basis). When a file is created, or stored, the file system can employ the encryption policies to determine whether the file should be encrypted prior to storage, and then the file system can implement the encryption and storage of the data files as appropriate. When a file is accessed, the file system can use the encryption policies and decrypt the data file before providing the decrypted data file to a requesting process. Because the encryption/decryption is performed by the file system, file system-level encryption is transparent to user mode processes, which access files and perform operations on files through system calls as normal.

Many operating systems involve trade-offs between usability for end-users and data security. Operating systems that are designed for end-user flexibility and compatibility are often considered lacking with regard to data security. As a result, private or confidential data may be at risk of disclosure or interception.

Operating systems designed to provide enhanced data security are often considered to be inflexible, complex and/or provide reduce system performance. This may discourage widespread adoption and/or lead to users disabling security features in order to improve usability or performance. As a result, private or confidential data may still be exposed.

Android™ is a mobile operating system designed primarily for use with touchscreen mobile devices such as smartphones and tablets. The Android™ operating system is based on a modified form of the Linux kernel.

Android™ is an example of an operating system that is often considered to provide flexibility and hardware compatibility at the expense of data security. A number of different approaches have been suggested to improve the security of the Android™ OS, such as sandboxing, screen pinning and smart lock, file based encryption, and mandatory access control such as SELinux, etc. In addition, users are encouraged to adopt best practices such as keeping up with updates and enforcing user permission control. However, these techniques may still be ineffective against certain types of attacks, such as abusive explorations of the root privilege.

Sandboxing and mandatory access control are techniques that can be used to prevent unauthorized access to protected data. In a mandatory access control process, every user mode process can be labelled with an associated process label and every file can be labelled with an associated file label. Access policies can be predefined and loaded into the kernel memory.

Access policies can specify whether a user mode process with a particular process label can access a file with a particular file label. In some cases, the access policies can include access criteria for each and every process label and file label (e.g. for each possible combination of process label and file label). When a user mode process issues an operation request to a file, the kernel can check the label of the user mode process and the label of the file against the predefined policies. The kernel can then grant or reject the operation request accordingly.

Sandboxing can limit the set of resources accessible by a particular application operating on a computing system. Sandboxes may be defined based on discretionary access control by creating a unique Linux UID for each application at time of installation. This process has been used in implementations of the Android™ operating system even before Android™ 4.3.

Mobile operating systems can also be configured to implement the based encryption methods. File based encryption protects data at rest against breach. Through encryption, plaintext data files can be encoded into an obscured form that is not recognizable unless decrypted with the corresponding decryption key. The Android™ operating system has included file based encryption since Android™ 7.0.

Security-Enhanced Linux (SELinux) provides a set of modifications to the Linux kernel to facilitate the implementation of mandatory access control policies. SELinux can also enhance the operation of sandboxing within an operating system. SELinux has been included in the Android™ operating system since Android™ version 4.3.

SELinux involves the use of a defined access policy to control data access. The access policy tends to rely on the application identification code (UID or AppID) and process ID (PID) of the process requesting to access data. In theory, SELinux is a powerful tool to provide a high level of data security. However, an operating system that implements SELinux remains vulnerable to abusive exploration of the root privilege.

The application identification code and process identifier for a given application and process are generated by the operating system without any input from a user or external system. As a result, the application identification code may be modified by a root user (e.g. when the rich operating system is rooted). For example, a root user or a process with root privilege may disable SELinux. The root user may also leverage system calls and/or system utilities to modify existing SELinux policies and/or create new SELinux policies. Any of these operations can jeopardize data security.

SELinux is also notorious for its complexity and difficulty of configuration as well as its interference with system performance. In practice, this often results in loosening or disabling of SELinux protection in order to avoid a complicated configuration or to reduce interference with system performance. As a result, the security provided by SELinux can be compromised.

SELinux also tends to lack fine granularity in its configuration policies and the configuration policies typically cannot be configured on demand and/or on the fly. SELinux may also provide insufficient protection for its labels assigned to data, applications, processes. Additionally, the labels assigned to data, applications, and processes in a computing device are often entirely disconnected from the end user (e.g. the generation and assignment of the labels is performed without any user input).

While the above-noted data security techniques provide some protection to user data and applications, they often remain vulnerable to sophisticated attacks. In a 2017 report published by eSecurityPlanet 64% of the security professionals surveyed doubted their organizational ability to prevent mobile data breaches. The report also found that more than a third of companies fail to secure mobile devices adequately. Thus, for many organizations, mobile data security remains a serious and live concern. Developing new data security methods that can address some of the deficiencies of the above-noted techniques may help improve organizational data security and assist in preventing mobile data breaches.

Embodiments described herein provide systems, methods and computer-readable medium that can control access to data stored on a computer system. The embodiments described herein can control whether an application or process has access to certain data files stored in the computer system, referred to herein as protected data files.

A computer system may be considered to have a series or stack of conceptual levels. For example, a mobile computing system that operates with the Android™ operating system may include conceptual levels such as an end-user level, an application level, a framework level, and a kernel level. In some cases, the computing system may include additional conceptual levels, such as a trusted execution environment (TEE).

Embodiments described herein may define access control systems and methods that operate across the various conceptual levels of the computing system. The access control systems and methods may be configured to establish a secure chain of trust across the conceptual levels of the computing system, e.g. all the way from the end user across the application, framework, and kernel levels, and to the TEE.

Embodiments described herein may apply cryptographic techniques at various different stages of data access, including data encryption. The embodiments described herein may provide both personalized and cryptographically secure access control (PACSAC) to establish a personalized and cryptographically secure chain of trust throughout the computer system (e.g. across all of the conceptual system levels).

Access control systems and methods described herein can be implemented to protect application data in operating systems such as the Android™ operating system. For each application to be protected, a user secret (e.g. a user code) can be used to cryptographically secure the creation of an application identifier used to identify a particular application. The application identifier can also be used to identify processes and/or data/files associated with the corresponding application. The user secret can also be used to generate file access data (e.g. key material) for a given application.

The application identifier and file access data can be used to authenticate and authorize processes corresponding to a given application. The access control system can be configured to permit processes to access protected data files only after the process is authenticated and authorized for the protected data files by the end user (or at least through the use of the user code). The authentication and authorization procedures can be cryptographically secured with the user secret. As such, for each protected application, corresponding protected data files can be protected against various attempted intrusions, such as abusive exploration of the root privilege, ransomware attacks, and data breaches for example.

Embodiments described herein may overcome shortcomings of some existing data security techniques, such as SELinux. SELinux relies on an application identification code (UID or AppID) and a process ID along with an access policy to provide access control. In SELinux, the application identification code and process ID are generated by the computing system without input from an end user and without the use of a user secret. As a result, the application identification code can be modified by the root user (for example, when the rich operating system is rooted.) Embodiments described herein may help overcome such rooting attacks by further cryptographically authenticating a process when the process is about to run. For example, the process may be authenticated based upon a valid user code. The valid user code may be received from a user, a stored user code already stored in the computing system (e.g. stored within the trusted execution environment), or even a code stored external to the computing system.

For example, a PIN code or password used to unlock a phone (once received from the user) may be used as the user code. In some cases, the computing system may prompt the user to provide the user code to perform various authentication and/or authorization procedures (e.g. when a process is initiated). Alternately or in addition, the user code may be stored in the system after it is initially received and can be reused for subsequent authorization and/or authentication procedures (e.g. when subsequent processes are initiated).

Alternately, a user code may be stored in the device without requiring direct input from the end user. For example, a pre-defined user code can be associated with applications pre-installed on the computing device. The pre-defined user code can be stored on the computing system, for instance in the non-volatile storage memory of a trusted execution environment. This may allow the pre-installed applications to be protected, authenticated, and authorized using the pre-defined user code.

System Architecture

The following is a description of a computer system architecture that may be used by itself in any access control system or method, or in any combination or sub-combination with any other feature or features disclosed including the user code, the application identifier, the application token, the file access data, the method of adding an application to a protected zone, the method of authenticating a process, the method of authorizing a process to access a data file, the protected data files, the method of initiating an application, the method of generating a new protected data file, and the method of accessing a protected data file.

FIG. 1 shows an example of a computer system 100 that may be used in accordance with the embodiments described herein. The example computer system 100 shown in FIG. 1 may be any type of computer system, such as a mobile device (e.g. a smartphone or tablet), a laptop computer, a desktop computer, a server and the like. The computer system 100 illustrated in FIG. 1 is an example of a computer system that may be used to provide personalized and cryptographically secure access control.

In the example illustrated in FIG. 1, the computer system 100 includes a plurality of system levels. As illustrated, the system levels include an end-user level 110, an application level 120, and an operating system level. The operating system level can include multiple operating system levels, such as an operating system framework 130, a kernel 140 and a trusted execution environment (TEE) 150.

In general, the computer system 100 can include a processor (e.g. a microprocessor having one or more CPU cores) and memory. The processor can be coupled to the memory via a computer data bus.

The memory may include both volatile memory and non-volatile memory such as non-volatile storage memory 109. Non-volatile memory stores computer programs consisting of computer-executable instructions, which may be loaded into volatile memory for execution by the processor as needed. It will be understood by those of skill in the art that references herein to computer system 100 as carrying out a function or acting in a particular way imply that one or more cores of the processor are executing instructions (e.g., a software program) stored in memory and possibly transmitting or receiving inputs and outputs via one or more interface.

For example, the non-volatile memory 109 can store a plurality of application instruction sets. Each application instruction set can correspond to one of the applications 102 installed on the computing device 100. The application instruction sets can define the operations of the applications 102 configured to operate within the rich operating system.

Memory may also store data input to, or output from, processor in the course of executing the computer-executable instructions. For example, non-volatile storage memory 109 can be configured to store a plurality of data files.

The file system modules 108 operating within the kernel 140 may be configured to store data files in the non-volatile storage 109 using a database structure. For example, a relational database or non-relational database, such as a key-value database, NoSQL database, or the like may be used to store the data files.

The plurality of data files may include a plurality of protected data files. The computer system can be configured to control access to the protected data files. For instance, access to the protected data files may be restricted to only processes that are authorized for the protected data files.

The plurality of data files can include a plurality of encrypted data files. For example, some or all of the protected data files may be stored as encrypted data files. In some cases, other data files may also be stored as encrypted data files. For example, all the data files stored on non-volatile storage 109 may be encrypted in some systems.

File labels can be stored in the non-volatile storage memory 109 in association with the data files to which they are assigned. For example, file labels can be stored as file attributes by file systems. The file attributes can then be read into kernel memory when the associated data files are accessed.

The computer system 100 can implement an access control procedure to protect the protected data files from unauthorized access. For example, the computer system 100 may be configured to prevent access to protected files associated with a specific application when a validated application token is not currently available for that application. A process associated with the application may only be permitted to access protected data files when a validated application token is present for the associated application.

The processor can be configured to provide at least two isolated execution environments. The isolated execution environments can include a rich execution environment (REE) and a trusted execution environment (TEE) 150. The rich execution environment can support various components of the computing device operating system, such as the framework 130 and kernel 140. The processor can define the REE and TEE 150 to operate in isolation from one another, such that the code and data loaded in the TEE 150 cannot be accessed by the components operating in the REE. The TEE 150 may be contained within a more secure portion of the processor to provide increased security for TEE 150. The computer memory can be divided into two parts, secure memory and non-secure memory. The secure memory may only be accessible to the TEE 150.

In some examples, the processor can be configured to provide separate operating systems in the REE and TEE 102. The processor can operate a rich operating system in the REE. Examples of rich operating systems that may operate in the rich execution environment include an Android™ operating system, Linux operating system, Microsoft Windows™ operating system etc. The rich OS can include the kernel 140 that facilitates processes associated with applications 102 running on the rich OS to access resources of the computer system 100. The application processes may make calls to the kernel 140 in order to access, and perform operations on, files stored in the non-volatile storage memory 109. During normal operation, a user 101 interacting with the computer system 100 may only interact directly with the rich operating system.

The processor can also be configured to operate a trusted operating system in the trusted execution environment 150. The trusted operating system can be loaded into, and operate within, the trusted execution environment 150. For example, a computing device using an Android™ rich operating system may be configured to implement the Trusty secure operating system within the trusted execution environment.

In general, the trusted operating system may be implemented by an operating system configured according to a defined set of operational criteria having a greater level of security than the rich operating system. For example, the trusted OS may have less capacity but higher security than the rich OS. The trusted operating system may be defined in accordance with criteria such as the Common Criteria for Information Technology Security Evaluation (e.g. ISO/IEC 15408) and specified Security Functional Requirements. The computer system 100 may provide hardware isolation for the trusted applications 115 operating in the TEE 150, so that the trusted applications 115 are protected from user installed applications running in the rich operating system.

For example, the trusted operating system may be configured with a "secure boot sequence". In the secure boot sequence, instructions of the trusted operating system can be divided into several (i.e. a plurality of) different operating system instruction pieces. Each operating system instruction piece can be digitally signed. The first instruction piece that needs to be loaded into computer memory in the boot sequence can be stored in read-only-memory (ROM). Each instruction piece can include instructions to verify the digital signature of the subsequent piece to be loaded into computer memory in the boot sequence. Optionally, the boot sequence may require the digital signature of each instruction piece to be verified in order for the boot sequence to complete. For example, the boot sequence can be aborted if the digital signature of one of the instruction pieces cannot be verified.

As illustrated, the computer system 100 can also include a trusted application 115 that runs on the trusted operating system within the trusted execution environment 150. Trusted processes running on the trusted OS can be called trusted applications (TAs) 115. TAs 115 can be provided with additional security and verification features, to ensure greater security for the trusted OS. For example, the trusted applications 115 can be digitally signed with trusted application vendor public keys so that hacking a trusted application becomes more complex.

As shown in FIG. 1, the kernel 140 can include a kernel module 106. The kernel module 106 can communicate with the trusted application 115 in order to process sensitive information. The kernel 140 can also include a task list 107. The task list 107 may provide a list of processes operating on the computer system 100. The kernel module 106 can also control operations of the file system 108 based on process information obtained from the task list 107.

In particular, the kernel 140, and the kernel module 106 and file system modules 108 operating within the kernel 140, may enable applications 102 to access non-volatile storage 109. The kernel module 106 and file system modules 108 may enable the applications 102 to perform operations related to files stored in non-volatile storage 109.

Processes corresponding to the applications 102 may transmit system calls to the kernel 140 in order to perform operations related to data files in the non-volatile storage 109. The file system 108 can be configured to fulfill the system call(s). The file system 108 can provide the processes with access to stored data files. The file system 108 may also perform operations to store additional data files created or modified by the processes.

The kernel module 106 may be configured to intercept system calls from the processes corresponding to the applications 102. When processes submit requests (or system calls) to the rich OS kernel 140, those requests can be intercepted by the kernel module 106 before reaching file systems 108.

The kernel module 106 can be configured to monitor and intercept data file requests received from user mode processes corresponding to applications 102 operating within the rich operating system. In some cases, the kernel module 106 may intercept every file request from a process corresponding to one of the applications 102 before the request reaches the file system 108.

The trusted application 115 can be configured to perform access control operations related to file requests issued to the kernel 140 of the rich operating system. The trusted application 115 can communicate with the kernel module 106. The kernel module 106 and trusted application 115 can manage access to the protected data files stored in the non-volatile storage 109.

The trusted application 115 operates in the trusted execution environment 150 to manage access to data files in response to the data requests received by the kernel module 106. Upon receiving a request from a process corresponding to one of the applications 102, the kernel module 106 can communicate with the trusted application 115 (e.g. through a secure channel). The kernel module 106 can transmit file request data to the trusted application 115 that corresponds to the intercepted request.

In some cases, the trusted application 115 may evaluate the file request data to determine whether or not the request should be permitted. The trusted application 115 may provide a response to the kernel module 106 indicating whether or not to fulfill the request.

The trusted application 115 may also provide the kernel module 106 with data necessary to fulfill the request, such as a key needed to decrypt an encrypted file. The kernel module 106 can then interact with the requesting process and file system 108 based on the data received from the trusted application 115.

The trusted application 115 and the kernel module 106 can communicate securely to manage data access by processes operating in the rich operating system. For example, the trusted application 115 can provide data usable to generate application tokens for the applications associated with the operating processes. The trusted application 115 may also provide the kernel module 106 with feedback on the currently available application tokens, e.g. by validating an application token.

The trusted application 115 can facilitate generation of the valid application token by monitoring whether a valid user code has been provided to the computer system 100. For example, an application token may only be generated after determining that a valid user code is available in the trusted execution environment 150. The kernel module 106 may communicate with the trusted application 115 to confirm whether the valid user code has been provided.

A valid application token may be generated using the valid user code or some modified form thereof. This may allow the trusted application 115 to subsequently validate the application token, for instance based on a valid user code (or modified form thereof) stored in the trusted execution environment 150.

Each encrypted file can have associated file access data (also referred to as a key attribute or key material). The file access data corresponding to a particular encrypted file may be used by the trusted application 115 operating in the trusted execution environment 150 to regulate access to that encrypted file.

As shown in FIG. 1, applications 102 may interact with the kernel 140 through a framework layer 130. The framework layer 130 can include various programs such as code libraries, compilers, and other programs used to facilitate operations of the applications 102 within the particular operating system.

A control gate 104 can be provided in the framework layer 130. The control gate 104 may facilitate authentication and authorization of the applications 102 attempting to access files stored in the non-volatile data storage 109 through calls to the kernel 140.

As in the example illustrated, the application level 120 can include a driver companion application 103. The driver companion application 103 can facilitate communications between the user 101 and the kernel 140. For instance, the driver companion application 103 can communicate with an enroll service 105 provided by the framework layer 130. A user 101 may interact with the enroll service 105 (via driver companion application 103) to specify that one or more applications 102 are protected applications, e.g. by enrolling applications 102A and 102B in access policies stored by the kernel module 106.

The configuration of computer system 100 can provide a trust chain from the user 101 to applications 102A, 102B, to the framework 130, to the kernel 140, to the TEE 150, and finally to the application data stored on the non-volatile storage 109. Thus, the computer system 100 may provide users with personalized and cryptographically secured access control throughout the layers of computer system 100.

The computer system 100 may also include various other components that are not shown in FIG. 1. For example, computer system 100 may include one or more communication interfaces, input devices, and output devices. For example, the output devices may include a suitable display for outputting information and data as needed by various computer programs. In particular, the display may display a graphical user interface (GUI) of the rich OS. Various other types of output devices may also be provided, such as speakers and/or tactile feedback sensors.

The input device may enable a user to interact with the rich OS. For example, the computer system 100 may include one or more input devices such as a keyboard, mouse, trackpad and various other input devices.

It should also be understood that some of the elements of the computer system 100, such as some or all of the memory and/or processor may be implemented using a combination of hardware and software resources, for instances using virtual machines and/or containers.

Communication interface such as one or more wired or wireless data network interfaces may be provided to enable communication with external systems or devices and/or for communication over a network, such as a Universal Serial Bus, Bluetooth™ or Ethernet connection. Computer system 100 may at times connect to external computers or servers via the Internet. For example, the computer system 100 may connect to a software update server to obtain the latest version of a software application or firmware.

User Code

The following is a description of a user code that may be used by itself in any access control system or method, or in any combination or sub-combination with any other feature or features disclosed including the system architecture, the application identifier, the application token, the file access data, the method of adding an application to a protected zone, the method of authenticating a process, the method of authorizing a process to access a data file, the protected data files, the method of initiating an application, the method of generating a new protected data file, and the method of accessing a protected data file. As used herein, the user code may also be referred to as a Qcode.

In embodiments herein, access control systems and methods may rely on a user code to control access to protected data files. The user code may form the basis of the chain of trust between the user 101 and the components of the computer system 100, such as the applications 102, kernel 140, and trusted execution environment 150.

The computer system 100 may be configured to prevent access to protected data files unless a valid user code is available, or has been made available, within the computer system 100. For example, access to protected data files may be prevented unless the user code is available within the trusted execution environment (although, in some cases, the user code may only be stored in a modified and/or encrypted form, such as a hashed version of the user code). Even when a valid user code is available, access to protected data files may still be restricted to a set of authorized applications.

In some examples, the user code can be provided to the computer system 100 by the end user 101. The end user 101 may input the user code through a user code input in various forms. For example, user 101 may provide a user code input to the computer system 100 that defines the user code (Qcode) directly using an input device such as a mouse, keyboard or touchscreen. Alternately or in addition, user 101 may provide the Qcode indirectly. For example, the user may provide biometric user code inputs such as a fingerprint or face image that can be measured by the computer system 100. The biometric inputs can be used to derive the user code (Qcode).

The computer system 100 may store user code data usable to determine whether a purported access code (i.e. the user code input) provided by a user (e.g. a passcode typed by a user, a fingerprint, a face image etc.) corresponds to the authentic user code. In some cases, the user code may be stored directly in non-volatile memory 109. For example, the user code may be stored in an encrypted or otherwise obscured form (e.g. a hashed version of the user code). The computer system 100 may then compare the purported user code received from user 101 to the stored version of the user code.

Alternately or in addition, the user code may not be stored in the non-volatile memory 109 directly. In some cases, the computer system 100 can be configured to never store the user code in the non-volatile memory 109 directly. For example, where the end user 101 provides a user code input that defines a purported user code indirectly (e.g. a biometric input), a code input modifier can be stored in the non-volatile memory 109. The code input modifier may be used by the computer system 100 to determine the purported user code by modifying the user code input using the code input modifier. For example, the code input modifier may define the difference between the user code and the user code input.

The computer system 100 may determine the user code once the user 101 has provided the user code input. For instance, the computer system 100 can determine the user code by applying the code input modifier to a biometric input. Without the user code input, determining the user code from the code input modifier may be no more than a random guess.

In some examples, the user code and/or code input modifier may be stored in a portion of non-volatile memory 109 accessible to the rich operating system. Alternately, the user code and/or code input modifier may be stored in secure memory accessible only to the trusted execution environment 150. That is, only the trusted operating system and/or trusted application(s) 115 may be able to access the portion of memory in which the user code and/or code input modifier are stored.

When a user 101 inputs a user code input including a purported user code, the computer system 100 can provide the purported user code to the trusted execution environment 150 for verification using a version of the user code stored in the trusted execution environment 150. The user 101 may thus provide one anchor of the trust chain within computer system 100 while the version of the user code stored in the trusted execution environment 150 can provide the other anchor of the trust chain.

In some examples, an obscured form of the user code may be stored in the trusted execution environment 150. For instance, the trusted execution environment 150 may store a hashed version of the user code. The purported user code can be hashed using the same hashed function to generate a hashed purported user code. The hashed purported user code can be compared to the stored hashed version of the user code in the TEE 150 to verify that the purported user code is the valid user code.

At one or more points during the operation of the computer system 100, the computer system 100 may generate a user code prompt for the user 101. The user code prompt can indicate to the user that the user code should be input. The computer system 100 may then determine the user code based on the input received from user 101. In some cases, a PIN code or password used to unlock a phone (once received from the user) may be used as the user code. Alternately or in addition, the computing system 100 may prompt the user to provide the code when an application and/or process is initiated.

The computer system 100 may determine a received user code based on the user code input received from user 101. The computer system 100 may then determine a hashed user code by hashing the received user code. The hashed user code can be compared to a stored hashed user code stored within a trusted non-volatile storage memory of the trusted execution environment 150. If the hashed user code matches the stored hashed user code, then computer system 100 can determine that the received user code corresponds to the valid user code. Otherwise computer system 100 can determine that the received user code is invalid.

In embodiments described herein, the user code may be used to generate various other types of data, such as application tokens and/or file access data. In some examples, the user code may be used directly in such calculations. Alternately, a hashed version of the user code may be used to further protect the valid user code that can be input by a user 101 from being determined.

Application Identifier

The following is a description of an application identifier that may be used by itself in any access control system or method, or in any combination or sub-combination with any other feature or features disclosed including the system architecture, the user code, the application token, the file access data, the method of adding an application to a protected zone, the method of authenticating a process, the method of authorizing a process to access a data file, the protected data files, the method of initiating an application, the method of generating a new protected data file, and the method of accessing a protected data file. As used herein, the application identifier may also be referred to as an appID.

As noted above, the computer system 100 can define a unique application identification code for each application 102 operating or installed in computer system 100 (e.g. the UID or AppID generated by the operating system). The operating system can assign each application its own application identification code. The application identification code may be generated without input from the user.

Each application may be assigned only one application identification code. The application identification code for each application can be assigned to that application 102 upon installation on system 100 (i.e. for each application, the application identification code can be assigned to that application when that application is installed on the system 100). The application identification code for a particular application 102 can remain unmodified unless and until the application is uninstalled.

In some operating systems (e.g. operating systems for laptop computer, desktop computers, and server computers) a UID may define a user identification code or user ID. Each user of the computer can be assigned a UID. The UID can be used to indicate which user has started a particular program/application (and related process.

Alternately, in other operating systems, including mobile operating systems such as Android, the concept of a UID can be implemented differently. Each application can be assigned its own UID (i.e. the application identification code). For instance, the operating system may assign a UID for each application by default.

For example, for a device running the Android™ operating system every Android™ package file installed on the device can be assigned to its own unified Linux user ID (the UID/application identification code described above). The application identification code is typically assigned when the application is installed into the device. The application identification code for the application can remain permanent in the device until the application is uninstalled. The operating system can define a sandbox for that application. The sandbox can be configured to prevent other applications from impacting that particular application.

In embodiments described herein, computer system 100 can be configured to generate an application identifier (appID) for each application 102 operating or installed on computer system 100 (and the corresponding application instruction set stored in the non-volatile memory 109). Each application 102 (and corresponding application instruction set) can be assigned a unique application identifier. The application identifier defined for each application 102 can be defined in addition to the application identification code defined by the operating system.

Each application identifier may provide a unique and persistent identity for the corresponding application and its related processes. This application identifier can be used to authenticate and authorize processes operating in the computer system 100. The application identifier may also be used to provide access control systems and methods. For instance, the application identifier may be used to specify which applications are permitted to access protected data files stored in memory 109. Each protected data file may be associated with the application identifier or application identifiers of the one or more applications permitted to access that protected data file.

For each application 102, the application identifier can be defined using the application identification code generated for that application 102. As described above, the application identification code can be unique for each application in an operating system. However, an application identification code may be reused after an application is uninstalled. As a result, application identification codes may not be persistent across the whole life span of data stored in the device. That is, an application identification code may be assigned to different applications over the lifespan of data on the device (even though a particular application identification code can only be assigned to one application at a given time). Thus, in access control systems that rely solely on the application identification code, new applications may accidentally inherit the data privileges of previously installed applications.

Typically, the assignment of application identification codes is managed by the root privilege. Similarly, UID verification is managed by the root privilege. As a result, access control systems that rely solely on the application identification code may be subject to abusive exploration of the root privilege.

Embodiments described herein may use additional identifying characteristics to generate the application identifier for each application. For example, the application identifier may be generated using an application certificate corresponding to the particular application. The application certificate may be data (e.g. a certificate string) defined by the developer of the particular application. In some cases, the same application certificate may be defined for multiple applications from the same developer. Alternately, the application certificate may be defined for the individual application. In some cases, the application certificate may be defined for a particular version of the application. Alternately, the application certificate can remain constant for different versions or updates of an application. Using the application certificate may ensure that the application identifier is specific to the application or at least to the application's developer.

In some operating systems, such as Android™ OS, each application package may be digitally signed using the corresponding application certificate. This may help prevent tampering with the application package. For a release package, the developer of the release package may specify that a particular certificate be used to sign the package. The certificate may be created by the developer for applications developed by their organization. This certificate can then be used by the computer system 100 when generating the application identifier.

In some examples, if a particular certificate is not specified for an application, the computer system 100 may specify a system certificate that can be used to generate the application identifier. For example, a default system certificate can be stored (see e.g., C:\Users\admin.android\debug.keystore) on the computer system.

A certificate file can contain a pair of public and private keys. The private key can be used to sign the application package. During installation, the system can use the public key corresponding to the private key in the certificate to verify whether the application package has been modified. The application package can be installed if the application package is proven to be unmodified. The computer system 100 may prevent installation of the application package if the evaluation of the signed application package indicates that the application package has been modified.

The application identifier may be defined using both the application identification code and the application certificate. Application identification data based on the application identification code may be combined with certificate data based on the application certificate to generate the application identifier. For example, the application identifier may be defined by concatenating the application identification data and the certificate data.

In some examples, the certificate data may include a hashed application certificate. The hashed application certificate can be generated by hashing the application certificate corresponding to that application. The application identifier may be generated by combining the application identification code and the hashed application certificate.

For example, the application identifier (appID) for an application can be defined by concatenating the application identification code and the hashed application certificate as:

UID|sha256hash(application certificate), where UID represents the application identification code (e.g. a 64 bit integer is assigned to the application), "|" represents a concatenation operation used to concatenate two strings into one (e.g., x|y meaning to concatenate x and y), the certificate may a string, and sha256hash( ) is an example hash function using the sha256 algorithm.

The application identifier can be defined with various forms. For example, the application identifier can be defined as a byte buffer. The byte buffer may include a portion corresponding the application identification code and a portion corresponding to the application certificate. For example, the byte buffer may be provided with length 40. The byte buffer may include an 8 byte portion corresponding to the application identification code (UID) and a 32 byte portion corresponding to the application certificate (e.g. the hashed version of the certificate).

In some cases, the application identifier may be stored in the non-volatile storage 109 in an encrypted form. For example, the application identifier may be encrypted using an encryption key stored in the trusted execution environment 150.

The application identifier encryption key can be defined based on the user code. Thus, input from the user may be required to define the application identifier. Similarly, user input may be required to evaluate an existing application identifier. This may ensure that the access control provided by system 100 is personalized to the user 101.

The application identifier can be used by an application such as application 102A and/or 102B to authenticate itself to the user 101 and to computer system 100. The system 100 may also use the application identifier to authorize an application to perform certain operations (e.g. accessing data, generating protected data etc.). The application identifier can used by the kernel module 106 to control the file system 108 for accessing application 102A or 102B data on the non-volatile storage 109.

The application identifier for a particular application can also be associated with processes corresponding to that application. Files generated by the processes corresponding to a particular application can also be associated with application identifier. For example, the application identifier can be associated with each stored data file corresponding to the particular application. This may allow the kernel module 106 to identify the corresponding application and manage whether a requesting process can access data stored in the non-volatile storage 109.

The computer system 100 may be configured to provide access control in multiple distinct phases. The current operating phase of the computer system 100 may vary depending on whether the user code is available. The level of security applied may vary depending on the current phase of the computer system 100. For example, the trust chain from the end user 101 to the TEE 150 may operate in two phases. A first security phase may provide a higher level of security than a second security phase.

For example, the computer system 100 may operate in a first security phase when the user code is not available. The computer system 100 may then operate in a second security phase when the user code is available.

In the first security phase, the computer system 100 can be configured to prevent any processes from accessing protected data in non-volatile storage 109. That is, all processes operating on the computer system 100 can be prevented from accessing the protected data in non-volatile storage during the first security phase. In this first security phase, the user code may be unavailable in computer system 100 (e.g. unavailable in the TEE 150). In some cases, it may not be possible for processes to access encrypted data in computer system 100 during the first phase as data required to decrypt the data (e.g. the user code) may be unavailable.

The computer system 100 may operate in a second security phase when the user code is available. In the second security phase, the computer system 100 can be configured to permit only authorized applications to access protected data. In the second security phase, the computer system 100 can be configured to prevent unauthorized applications from accessing protected data. The computer system 100 can prevent unauthorized applications from accessing protected data even while there is an authorized application accessing the protected data.

The computer system 100 may differentiate between operating in the first security phase and the second security phase based on when the user code is provided to system 100. A timestamp corresponding to when the user code is input may be used to differentiate the two phases. In embodiments described herein, a token, herein referred to as an appToken, can be used to identify when the user code has been provided.

Application Token

The following is a description of an application token that may be used by itself in any access control system or method, or in any combination or sub-combination with any other feature or features disclosed including the system architecture, the user code, the application identifier, the file access data, the method of adding an application to a protected zone, the method of authenticating a process, the method of authorizing a process to access a data file, the protected data files, the method of initiating an application, the method of generating a new protected data file, and the method of accessing a protected data file. As used herein, the application token may also be referred to as an appToken.

Figure 2:
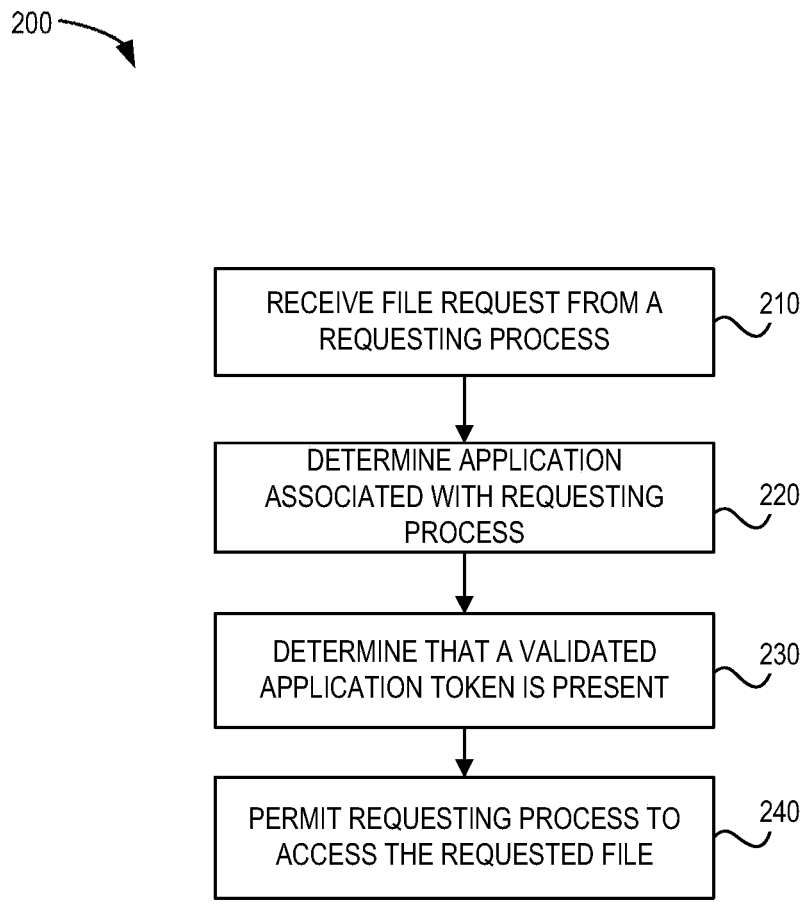
FIG. 2 is a flow diagram illustrating an example process for authorizing a process that may be used with the computer system FIG. 1 in accordance with an embodiment.

In embodiments described herein, the application token may be used to evaluate whether an application is permitted to access a requested file. FIG. 2 illustrates an example process 200 that can be used to evaluate whether a process is permitted to access a requested file. Process 200 is an example of a process that may be implemented by a computer system such as computer system 100.

At 210, kernel module 106 may receive a file request for a requested file stored in the non-volatile storage memory 109. The requested file may correspond to one of the protected data files in the plurality of protected data files. In some examples, the kernel module 106 may determine that the requested file is one of the protected data files based on attribute data associated with the requested file.

The file request can be received from a requesting process operating within the rich operating system. For instance, the requesting process may issue a system call to the kernel 140 for the requested file. The kernel module 106 may intercept the file request prior to the file request reaching the file system 108.

At 220, the computer system 100 can be configured to determine an associated application associated with the requesting process. For instance, the computer system 100 may determine which of the applications 102 installed on the computing device 100 is associated with the requesting process in response to the system call for the requested file. The kernel module 106 may identify an application identifier associated with the requesting process in order to identify the associated application.

At 230, the computer system 100 may determine whether a validated application token is present for the associated application in response to the file request. The kernel module 106 may use the application identifier of the associated application to determine whether the application token is present in computer system 100. The kernel module 106 may also validate the application token, e.g. through communication with the trusted application 115.

At 240, the compute system 100 can provide the requesting process with access to the requested data file following a determination that the validated application token is present. The computer system 100 may permit the requesting process to access the requested data file only if the validated application token is present. The computer system 100 may otherwise prevent the requesting process from accessing the requested data file.

The computer system 100 can be configured to prevent plaintext/ciphertext of protected files stored on the non-volatile storage 109 from being accessed (e.g. read/written) unless the application token of the application corresponding to the requesting process is available in the computer system 100. Alternately or in addition, each protected file may be associated with one or more specified applications 102A. This association can be indicated through the use of the application identifier. The computer system 100 can prevent read and/or write operations to the protected files unless the application token of the application associated with those files is present and validated.

The computer system 100 may generate the application token for a particular application upon determining that a valid user code is available within the computer system 100. The application token may only be generated if the valid user code is available.

Figure 3:
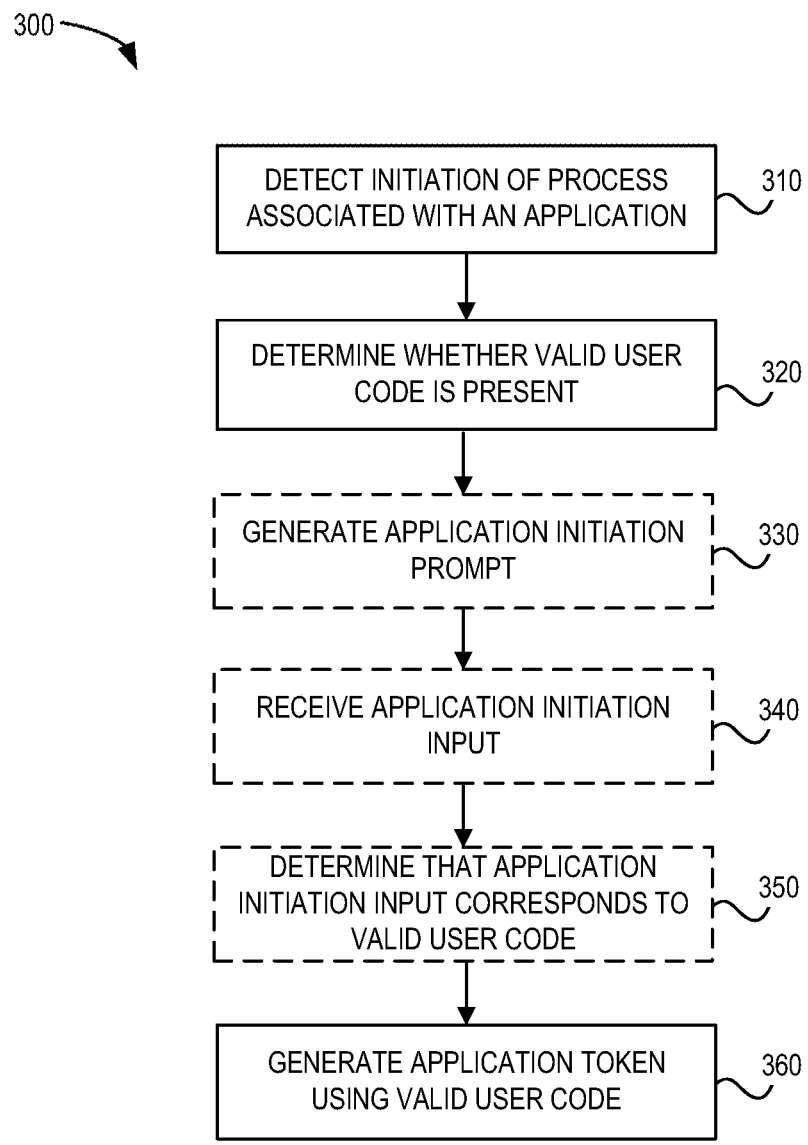
FIG. 3 is a flow diagram illustrating an example process for generating an application token that may be used with the computer system FIG. 1 in accordance with an embodiment.

Referring now to FIG. 3, shown therein is an example process 300 that may be used to generate an application token. Method 300 is an example token generation process that may be implemented by a computer system such as computer system 100. At 310, the computer system 100 may detect initiation of a first process associated with a particular application.

At 320, the computer system 100 may then determine whether the valid user code is available. The application token may be defined only after the valid user code is available within the computer system 100.

For example, the computer system 100 may determine whether the valid user code is available within the trusted execution environment. Upon determining that the valid user code is available, the computer system 100 may generate the application token using the valid user code at 360.

The computer system 100 may determine a time stamp corresponding to the initiation of the first process. The application token can then be generated using the time stamp. The application token can be defined using a time stamp that specifies when the first process associated with the application is initiated. The application token may thus provide an indication of when that application was first initiated.

The application token may be generated using the unique application identifier for the associated application. This can ensure that each application has a unique application token that can be verified prior to providing an associated process with access to the requested data file.

The application token may be generated using data that is verifiable through communication with the trusted execution environment 150. A portion of the data used to generate the application token may be only available within the trusted execution environment 150 (or only derivable from data stored in the trusted execution environment). For instance, data stored in the trusted execution environment 150 or generated from other data stored in the trusted execution environment 150 may be used to generate the application token. This may ensure that the trusted execution environment 150 is included (and must be consulted) in the process of validating an application token.

In some cases, the application token may be defined using a combination of the application identifier and the user code. This may allow the application token to be validated subsequently using the user code. For instance, a hashed version of the user code may be used to generate the application token. This may ensure that the user code is not determinable from the application token.

As an example, the application token may defined using the timestamp, application identifier, and the user code. For instance, the computer system 100 may define an application token (appToken) as:

enc(timestamp|appID_length|appID, Qcode_hash) | hmac(timestamp|appID_length|appID, Qcode_hash)

where the timestamp represents the time stamp at the moment when the first process corresponding to the associated application is started, enc(,) represents an example encryption function where enc(x,y) represents the output string of encrypting the string of x using a key of y, hmac(,) represents an example hash function where hmac(x,y) represents the output string of hashing the string of x with a secret key of y, the "|" operator represents a concatenation operation, appID_length represents the length in bytes of the application identifier (appID), and Qcode_hash represents the hashed value of the user code (Qcode).

The application token may be generated in response to a user 101 inputting a user code input corresponding to the valid user code. For instance, as described above, the computer system 100 may detect initiation of a first process associated with the associated application at 320.

At 330, the computer system 100 may generate an application initiation prompt in conjunction with the initiation of the first process. The application initiation prompt can be defined to prompt a user to input a user code or corresponding user code input.

For instance, at 320, the computer system 100 may determine whether the user code is available within the computer system 100. The application initiation prompt may be generated in response to determining that the user code is not available within the computer system 100. Alternately or in addition, the application initiation prompt may be generated in response to each application that is initiated. In some cases, the application initiation prompt may be generated in response to each user-mode application that is initiated while the application initiation prompt may be omitted for system applications.

At 340, the computer system 100 may receive an application initiation input (e.g. a user code input). A user may provide the application initiation input in response to the application initiation prompt. The application initiation input may correspond to an expected user code input that defines a purported user code (directly or indirectly).

At 350, the computer system 100 may then determine whether the purported user code corresponds to the valid user code. At 360, upon determining at 350 that the application initiation input corresponds to the valid user code (i.e. that the purported user code matches the valid user code), the computer system 100 may generate the application token.

As noted above, the computer system 100 may determine whether a validated application token is present in order to respond to a file request. An application token that is associated with a particular application may be validated through communication with the trusted execution environment 150. For instance, validation of an application token can be performed through communication between the kernel module 106 and the trusted application 115 operating in the trusted execution environment 150.

As noted above, the application token may be generated using data that requires access to the trusted execution environment 150 (such as the hashed user code). This trusted data may be only available to the computer system 100 in the trusted execution environment 150 or through input from the end user 101. This may ensure that validation of the app-Token can only be carried out in the TEE 150.

As described above, the application token can be generated in response to direct input from the user 101 and validated in the TEE 150. The application token may thus operate as a software-based lock that can provide a high level of security for the protected files stored in the non-volatile storage memory 109. That is, when the application token is not available for the application corresponding to a requesting process, access to the protected files can be prevented. This may help protect the protected files against any software level hacks/attacks.

For example, a protected data file may be associated with a particular application. Accordingly, when the application token corresponding to the particular application 102A is unavailable, the computer system 100 can prevent a requesting process from access that protected data file. This provide protection against software level hacks/attacks for data belonging to that application 102A.

When the application token corresponding to an application associated with the protected data is available, there is an authorized application 102A accessing the protected data. In such circumstances, the computer system 100 may still be configured to prevent unauthorized access to the protected data files. For instance, requests from other processes operating in the computer system 100 may still be prevented from accessing the requested data file if the data file is not associated with the application of the requesting process.

In some examples, the protected data files may be encrypted. The protected data files may be encrypted using an encryption key which can be generated within the TEE 150. This may further prevent unauthorized access to the protected data files.

File Access Data

The following is a description of file access data that may be used by itself in any access control system or method, or in any combination or sub-combination with any other feature or features disclosed including the system architecture, the user code, the application identifier, the application token, the method of adding an application to a protected zone, the method of authenticating a process, the method of authorizing a process to access a data file, the protected data files, the method of initiating an application, the method of generating a new protected data file, and the method of accessing a protected data file.

In embodiments described herein, some or all of the data files stored in the non-volatile storage 109 may be stored in an encrypted form. For instance, the protected data files stored in the non-volatile storage 109 may be encrypted. Alternately or in addition, all the data files stored in the non-volatile storage 109 may be encrypted.

Alternately or in addition, data files associated with one or more particular applications may be encrypted. For instance, computer system 100 may include an application 102A requiring a higher level of security. Accordingly, all the data files corresponding to application 102A may be stored in an encrypted form.

Each encrypted data file can be encrypted using an encryption key. In some cases, the encryption key for each encrypted file may be specific to that file (a file-specific encryption key). Thus, a file-specific decryption key may be required in order to access the plaintext data of each encrypted data file. Depending on the particular encryption technique used, the decryption key may be the same as the encryption key or the decryption key may be different from the encryption key.

Each encrypted data file can be associated with file access data. For example, the file access data may be stored as an extended attribute of the encrypted data file. The file access data associated with an encrypted data file can include key material. The key material may be used to identify the decryption key corresponding to that encrypted data file. The file access data may allow the decryption key to be determined within the trusted execution environment 150. As noted above, the encryption/decryption key may be specific for each encrypted file. Accordingly, the key material for each encrypted file may be file-specific.

The file access data may be generated based on data stored within the trusted execution environment 150. For example, the key material for each encrypted file may be defined using an access code secret corresponding to the user code. The access code secret may be accessible only within the TEE 150. This may ensure that decryption of an encrypted data file requires communication with the trusted execution environment 150. As a result, trusted applications 115 operating in the trusted execution environment can determine whether the encryption key is provided for the requested encrypted data file.

Each encrypted data file in the plurality of encrypted data files stored by the non-volatile storage memory 109 may be encrypted using a file-specific encryption key. The trusted application 115 can be configured to determine the file-specific encryption key independently for each encrypted data file. For example, the trusted application 115 may determine random key information for each encrypted file independently (e.g. at the time of file creation). The random key information may then be used to derive the encryption key for the corresponding file. This key information, or data usable to derive the key information, can be included in the file access data for the corresponding file.

In some cases, an encrypted data file may be associated with a particular application. For example, the associated application may be the application used to generate the particular encrypted data file.

The file access data associated with a particular encrypted data file may include application-specific access data. The application-specific access data may be defined based on identifying data associated with the associated application. For example, the application-specific access data corresponding to a particular data file may be defined using the application identifier of the associated application.

In some cases, the file access data may be defined with an obscured form. For instance, the file access data may be encrypted using the user code (or user code data) stored in the trusted execution environment 150. As a result, deriving useful data from the file access data may require knowledge of the user code. As the user code may only be available within the trusted execution environment 150 (or through user input), this may ensure that either the trusted execution environment 150 or the user 101 are involved in deriving the plaintext file access data.

The computer system 100 may generate the file access data as a string. For instance, for a data file associated with an application corresponding to a particular application identifier (appID) the file access data can be defined with the format:

```
class_id|profile_id|reserved_len|appID_length|appID|enc(keyIndex,
Qcode_secret)|enc(keyLength|fileKey,Qcode_secret)|
hmac(class_id|profile_id|reserved_len|appID_length|appID|keyIn-
dex|
keyLength|fileKey,Qcode_secret)
``` where class_id represents a constant indicating the class of encryption key, profile_id represents a 64 bit integer usable to differentiate the profile associated with the file (the profile may correspond to a particular user of the device), fileKey represents the file encryption key, enc(,) represents an encryption function where enc(x,y) represents the output string of encrypting the string of x using a key of y, hmac(,) represents a hash function and hmac(x,y) represents the output string of hashing the string of x with a secret key of y, the "|" represents a concatenation operation, and Qcode_secret represents an access code secret that is only accessible within the TEE 150. Example constants that are only accessible within the TEE 150 are described in further detail in U.S. patent application Ser. No. 16/521,945 entitled "Personalized Cryptographically Secure Access Control in Trusted Execution Environment" the entirety of which is incorporated herein by reference.

The file access data string may be stored as an extended attribute of the encrypted data file. The file access data string may subsequently be used by the computer system 100 to identify and/or generate the decryption key for the encrypted data file.

In some embodiments, the file access data may be generated within the trusted execution environment 150. As noted above, the file access data may be generated using data that is only available within the TEE 150, such as the access code secret. The file access data may thus subsequently be analyzed within the TEE 150 in order to identify the appropriate decryption key.

The file access data can be sent out of the TEE 150 to the rich operating system. As noted above, the file access data can be stored as an extended attribute of the protected file on non-volatile storage 109. Alternately or in addition, the file access data may be stored as the file attribute that can be read through the file system 108 and sent back to the TEE 150.

Method of Adding an Application to the Protected Zone

The following is a description of a method of adding an application to a protected zone that may be used by itself in any access control system or method, or in any combination or sub-combination with any other feature or features disclosed including the system architecture, the user code, the application identifier, the application token, the file access data, the method of authenticating a process, the method of authorizing a process to access a data file, the protected data files, the method of initiating an application, the method of generating a new protected data file, and the method of accessing a protected data file.

In embodiments described herein, the computer system 100 may specify one or more applications as a set of protected applications. The applications in the set of protected applications may be permitted access to protected data files. The protected applications may also be capable of generating new protected data files.

Access by other applications to protected data stored by a protected application may be limited. In some cases, other applications may be prevented from accessing the protected data stored by a protected application.

In some cases, access to protected data may be restricted primarily for user-mode processes. For instance, unprotected user-mode applications may be prevented from accessing the protected data stored by a protected application. In some cases, system applications may still be permitted to access the protected data—assuming that other requirements of the access control system (e.g. availability of the user code, application token, and/or decryption key) are satisfied.

The computer system 100 can provide methods for identifying an application as a protected application (e.g. enrolling an application in a protected application zone). For example, the computer system 100 may define an access policy file that identifies one or more protected applications. The access policy file can be used by the computer system 100 to determine whether a particular application (or process associated with that particular application) is permitted to access a requested file.

The access policy file can be defined to include the unique application identifier of each protected application in the set of protected applications. When a requesting process issues a file request to the kernel module 106 for a protected data file, the kernel module 106 can review the access policy file to determine whether the application identifier of the associated application is included in the access policy file. The kernel module 106 may permit the requesting process to access the requested data file only if the unique application identifier of the associated application is included in the access policy file. The kernel module 106 may otherwise prevent the requesting application from accessing the requested data file.

The access policy file may be stored in the non-volatile storage memory 109 of the computer system 100. Alternately or in addition, the access policy file may be stored in non-volatile storage of the trusted execution environment 150.

The computer system 100 may provide a system function that can be used to protect data files stored in the non-volatile storage memory. For example, a computer system 100 operating the Android™ operating system may provide a system function to protect files for any Android™ applications. As shown in FIG. 1, the computer system 100 can include an enroll service 105 that can be used to enroll an application to the protected zone (i.e. to identify an application as a protected application).

In some cases, the computer system may permit the user 101 to specify one or more applications as a protected application. The user 101 may add the application to a 'protected zone' to ensure that data from the application is stored and managed as protected data within the computer system 100. The user 101 may also remove applications from the protected zone.

The user 101 may select an application to be added to the protected zone. After the user 101 selects the application, the computer system 100 can generate a policy modification prompt to request or prompt the user 101 to provide the user code (Qcode). The computer system 100 may then receive a policy modification input (e.g. a user code input). The computer system 100 can verify that the user code input corresponds to the valid user code through communication with the trusted application 115. Similarly, where the user 101 selects an application to be removed from the protected zone, the computer system 100 can validate the request based on the user code.

Once the received user code input is successfully verified in the TEE 150, the computer system 100 may permit the enroll service 105 to perform operations such as adding an application to the protected zone and/or removing an application from the protected zone.

To add an application to the protected zone (i.e. identify an application as a protected application), the application identifier for that application can be determined. The determined application identifier can then be added to the access policy file stored in non-volatile storage 109 and/or the TEE 150.

Optionally, the computer system 100 may include a kernel access policy data structure (also referred to as an appID_list) in kernel memory of the kernel 140. The application identifier may also be added to the kernel access policy data structure.

To remove an application from the protected zone (i.e. specify that the application is no longer a protected application), the application identifier for that application can be determined. The application identifier can be used to search the access policy file stored on the computer system 100 (e.g. in the non-volatile storage 109). Alternately or in addition, the application identifier can be used to search the kernel access policy data structure stored in the kernel memory.

If the application identifier is identified in the access policy file (or kernel access policy data structure), that application identifier can be deleted from the access policy file stored on the computer system 100. The application identifier can also be deleted from the kernel access policy data structure stored in the kernel memory.

The computer system 100 may store the access policy file in the non-volatile storage memory 109 in association with user code data (e.g. a hashed version of the user code, a hashed code corresponding to the valid user code) generated from the user code. The computer system 100 can compare received user code data determined from a received user code input with the user code data stored in association with the access policy file.

The computer system 100 may prevent modifications (e.g. write operations, delete operations) to the access policy file unless a policy modification input that corresponds to the valid user code is received and verified against the user code data stored in association with the access policy file. This may help prevent unauthorized modifications to (i.e. tampering with) the access policy file.

For example, the computer system 100 may store the access policy file in the non-volatile storage memory 109 in association with a hashed version of the user code. The data access policy file can be secured using a hashed value of the user code. The computer system 100 may thus prevent write operations to the policy file in the absence of the user code.

In some cases, read operations on the access policy file may be permitted even in the absence of the user code (i.e. in the absence of a policy modification input that corresponds to the user code). The system 100 may thus access the access policy file in order to determine know whether an application is protected or not, even when the user code is not available.

In operation, the computer system 100 can receive a policy update input specifying a particular application to be added to the set of protected applications included in the access policy file. In some examples, the computer system may generate an update verification prompt in response to the policy update input. The update verification prompt can be defined to prompt the user to input the user code. This may ensure that the user 101 has properly authorized the modification to the access policy file.

The computer system 100 can receive an update verification input (e.g. a user code input) in response to the update verification prompt. The computer system 100 can then determine whether the update verification input corresponds to the valid user code using the user code data (e.g. hashed version of the user code) stored in association with the access policy file. The computer system 100 can update the access policy file to include the particular application in response to determining that the update verification input corresponds to the valid user code. If the updated verification input does not corresponding to the valid user code, the modification to the access policy file can be denied/prevented.

As noted above, the kernel 140 may store an access policy data structure in a kernel memory accessible within the rich operating system. The computer system 100 may be configured to synchronize the access policy data structure with the access policy file stored in the non-volatile storage memory 109. The access policy data structure (i.e. the appID_list data structure) and access policy file can be synchronized such that the access policy data structure includes the unique application identifier of each protected application in the set of protected applications defined in the access policy file.

In some cases, updates to the access policy file and access policy data structure can also be synchronized. For example, the access policy file may be updated by initially updating the kernel memory access policy data structure. The existing access policy file may then be overwritten using the updated kernel memory data structure.

In some embodiments, the access policy data structure in the kernel memory can be instantaneously updated in response to a policy update input (following verification) from the user 101. The updated content of the access policy data structure in the kernel memory can then be flushed to overwrite the corresponding policy file in the non-volatile storage. This process may be preferred where updates to the access policy file are not expected to occur often.

As noted above, the access policy file and updates to the access policy file can be controlled through the user code. The access policy file may thus be cryptographically secured based on the user code (which can be received from the user 101 and is stored in the hardware anchor of the trust chain in the TEE 150).

Method of Authenticating a Process

The following is a description of a method of authenticating a process that may be used by itself in any access control system or method, or in any combination or subcombination with any other feature or features disclosed including the system architecture, the user code, the application identifier, the application token, the file access data, the method of adding an application to a protected zone, the method of authorizing a process to access a data file, the protected data files, the method of initiating an application, the method of generating a new protected data file, and the method of accessing a protected data file.

In many computer systems, process authentication is performed based on the application identification code of the associated application. When a process is initiation, the application certificate of the application corresponding to that process can be verified. The process can also be associated with a process identifier.

Once the application certificate has been verified, the process identifier can be labelled using the application identification code of the associated application. This procedure can introduce potential security vulnerabilities into the computer system. For instance, the application identification code may be used to label data files corresponding to the application. When the application identification code is reused (e.g. when the application is uninstalled and the application identification code is assigned to a different application), data leaks may result in the different application being able to access data files that were stored by the previous application with the same identification code.

In addition, it may be possible to modify the process labels using system calls (e.g., setUID) which may introduce loopholes to the data security. These system calls are generally guarded by the root privilege. However, for a system that demands data security against abusive exploration of root privilege, the application identification code may not be a good choice for process authentication.

Embodiments described herein may provide a cryptographically secured procedure for authenticating a process for an application. In embodiments described herein, the application identifier for a particular application can be associated with each process corresponding to that application. The application identifier can be associated with the process identifier e.g. by labelling the process identifier with the corresponding application identifier.

As shown in FIG. 1, a process mapping data structure can be defined in the kernel 140. The process mapping data structure can be stored in the kernel memory. The process mapping data structure can be defined to include a mapping between each process identifier maintained in the task list 107 and the application identifier of the corresponding application. The mapping between a particular process identifier (PID) and the corresponding application identifier may be represented as PID_appID. The mapping can be defined when each new process is created (e.g. following verification of the corresponding certificate) and stored in the process mapping data structure. The process mapping data structure may be updated when each process is initiated. The process mapping data structure may also be updated when each process is terminated.

In the computer system 100, cryptographically secured process authentication may be carried out on the framework level 130. For instance, process authentication can be performed by the control gate 104. The mapping (PID_appID) between a given process identifier and the corresponding application identifier can be generated by the control gate 104. The control date 104 may receive input from application 102A/102B and the user 101 when a new process is created in order to generate the mapping. In some cases, the control gate 104 may only generate the mapping (PID_appID) after the application certificate is verified. The mapping can then be stored in the process mapping data structure.

Once the mapping (PID_appID) has been stored, the process corresponding to the process identifier can subsequently be authenticated as a process corresponding to the application with the corresponding application identifier using the process mapping data structure.

The process mappings may be secured using user access code. For example, the process mapping data structure can be secured using the user code. Modifications to the process mapping data structure may require user code data corresponding to the user code in order to be implemented.

As a result, the process mapping data structure may be managed and protected through interactions between the kernel module 106 and the trusted application 115. The process mapping data structure may ensure that a process's identity (and association with a particular application) can be securely authenticated and maintained during its operational life span through authentication with the TEE 150.

As noted above, the process mapping data structure may be stored in the kernel memory to record the association between process identifiers and application identifiers. This may provide a centralized mapping between processes and the corresponding applications.

Alternately or in addition, a distributed mapping scheme may be used. For example, the corresponding application identifier can be stored in the task structure of a process stored in the task list 107. When the application identifier is included in the task structure of the process, this may provide a simple method for indicating that the process has been authenticated. In some cases, the computer system 100 may require additional security in order to prevent imitations of the application identifier in the task structure and/or prevent the application identifier item in the task structure stored in the task list 107 of a legitimate process from being tampered.

Method of Authorizing a Process to Access a Data File

The following is a description of a method of authorizing a process to access a data file that may be used by itself in any access control system or method, or in any combination or sub-combination with any other feature or features disclosed including the system architecture, the user code, the application identifier, the application token, the file access data, the method of adding an application to a protected zone, the method of authenticating a process, the protected data files, the method of initiating an application, the method of generating a new protected data file, and the method of accessing a protected data file.

The computer system 100 can be configured to determine whether a requesting process is authorized to access a requested data file. The computer system 100 can be configured to provide a personalized and cryptographically secured method for authorizing the requesting process to access the requested data file.

The process authorization procedure can include a plurality of authorization phases. For example, the process authorization procedure can include three authorization phases. In a first authorization phase, the application token (appToken) corresponding to a particular application can be generated. For instance, the token may be generated using the token generation process described herein above (e.g. method 300). The token generation process may be initiated when a user 101 provides input to start that application 102 within computer system 100, e.g. by selecting an application icon, providing a voice command etc.

In the example of computer system 100, the application token may be generated by the control gate 104. For example, the application token 104 corresponding to an application 102 may be generated through inputs from the user 101 and the application 102 as described herein above. When the application token is generated by control gate 104 it can be forwarded to the kernel module 106. The kernel module 106 may, in turn, transmit the application token to the TEE 150. The trusted application(s) 115 operating in the TEE 150 can be configured to verify the token received from kernel module 106.

When a process is initiated, the computer system 100 can determine a process identifier associated with the process. The computer system 100 may then validate the process certificate for that process. For example, the process certificate can be compared to application certificate to ensure that the process has a valid and authentic certificate. If the process is the first process initiated for the application, the computer system 100 may further validate and authenticate the application certificate.

In some cases, the computer system 100 may be configured to prompt user authorization prior to permitting an application to execute. After a process has been created and the certificate has been successfully validated, the system can prompt the end user 101 to provide the user code in order to authorize the application to run. The computer system 100 can prompt the end user 101 to provide the user code before the process starts to load the application code to execute.

For example, upon validating the process certificate, the computer system 100 can determine whether the associated application is one of the protected applications. If the associated application is one of the protected applications, the computer system 100 may be configured to use the user code to manage updates to the processing mapping data structure. The computer system 100 can generate a process initiation prompt for the user 101. The process initiation prompt is defined to prompt the user to input the user code (e.g. directly or through a related user code input). The computer system 100 can then receive a process initiation input (i.e. a user code input) in response to the process initiation prompt. The computer system 100 can determine whether the process initiation input corresponds to the valid user code.

The user code input (e.g. received in a process initiation input in response to the process initiation prompt) can be provided to the control gate 104. The control gate 104 can route purported user code data based on the user code input to the trusted application 115 (via kernel module 106) for verification within the trusted execution environment 150.

For example, the control gate 104 may compute a hash of the user code input. The hashed version of the user code input can then be provided to the kernel module 106. The kernel module 106 can, in turn, transmit the hashed version of the user code input to the trusted application (TA) 115 in the TEE 150. As noted above, a hashed version of the user code may be stored within the TEE 150. The trusted application 115 can compare to the hashed version of the user code input with the hashed version of the user code stored in the TEE 150. An example process for verifying the user code is described in further detail in U.S. patent application Ser. No. 16/521,945 entitled "Personalized Cryptographically Secure Access Control in Trusted Execution Environment" the entirety of which is incorporated herein by reference.

If the user code is not verified by the trusted application 115, the control gate 104 may prevent the process and application from executing. Alternately or in addition, the control gate 104 may generate a further prompt to allow the user 101 a further opportunity to provide the user code.

If the user code is verified by the trusted application 115, the control gate 104 may then generate the application token for the corresponding application. As explained above, the control gate 104 can generate the application token using the current time stamp and the application identifier of the corresponding application. The control gate 104 can then provide the application token to the trusted application 115 in the TEE 150 (e.g. via kernel module 106). The application token may indicate to the trusted application 115 that the application 102 has been initiated.

The trusted application 115 can be configured to manage encryption keys and/or encryption key material for data files stored in the non-volatile storage 109. The trusted application 115 may control when encryption keys are provided to the kernel module 106 to decrypt requested data files stored in non-volatile storage 109.

The trusted application(s) 115 within the trusted execution environment 150 may be configured to generate and/or provide encryption key data only after an appropriate application token is available within the trusted execution environment 150. Once the application token has been provided to the TEE 150, corresponding processes operating on the rich operating system may be able to retrieve the file encryption keys from the TEE 150 in order to access protected and encrypted data files stored on the non-volatile storage 109. Prior to the application token being provided to the TEE 150 (e.g. from control gate 104), the encrypted data files on the non-volatile storage 109 may be inaccessible to processes operating within the rich operating system.

Once the computer system 100 has determined that the process initiation input corresponds to the valid user code (and the application token is available within the trusted executing environment), the computer system 100 may conduct a second phase of the process authorization method. The second authorization phase can occur after the user code input has been obtained from the end user 101 and successfully verified in TEE 150. In the second phase, the computer system 100 may determine whether the requesting process is permitted to access the requested protected data file.

In the second authorization phase, the computer system 100 (e.g. control gate 104) can determine the application identifier corresponding to the requesting process. The computer system 100 can then determine whether the application identifier corresponds to one of the protected applications using the stored access policy file and/or the kernel access policy data structure.

For example, the application identifier can be provided to the kernel module 106. The kernel module 106 can use the received application identifier to determine whether the associated application is included in the kernel access policy data structure.

If the application identifier corresponds to a protected application listed in the kernel access policy data structure and/or access policy file, the computer system 100 can determine that the requesting process is a protected process. The requesting process may then be allowed to access the protected data stored in non-volatile storage 109.

The process identifier of the requesting process may also be can be stored in an authorized process data structure (also referred to as a trusted_PID data structure or PID_list data structure) in the kernel memory. The authorized process data structure can be defined to provide a white list of all authorized processes. The authorized process data structure can be accessible within the rich operating system. The authorized process data structure may provide a centralized data structure that can be subsequently evaluated when determining whether a requesting process is permitted to access a requested data file.

As noted above, the second authorization phase may occur only after a user code input is received from the user 101 and successfully verified by the trusted application 115.

This may ensure that modifications to the authorized process data structure are personalized and secured through the user code.

The computer system 100 can also operate in a third authorization phase. The third authorization phase may occur after the process has been authenticated and the corresponding process identifier has been added to the authorized process data structure. The kernel module 106 can be configured to access and evaluate the authorized process data structure on an ongoing basis. This may allow the kernel module 106 to manage file operations performed by the file system 108 for protected files stored in the non-volatile storage 109.

For example, when a requesting process transmits a file read request and/or file write request in respect of a protected file through the file system 108, the system 100 can check if the process identifier of the requesting process is stored in the authorized process data structure maintained by the kernel module 106 in the kernel memory. The system 100 can be configured to allow the requesting process to perform the requested operation only after determining that the process identifier of the requesting process is stored in the authorized process data structure.

Protected Data Files

The following is a description of protected data files that may be used by itself in any access control system or method, or in any combination or sub-combination with any other feature or features disclosed including the system architecture, the user code, the application identifier, the application token, the file access data, the method of adding an application to a protected zone, the method of authenticating a process, the method of authorizing a process to access a data file, the method of initiating an application, the method of generating a new protected data file, and the method of accessing a protected data file.

The computer system 100 can be configured to limit access to particular protected data files stored in the non-volatile storage 109. The protected data files may provide cryptographically secured data. In some cases, the protected data files may include application-specific protected data files. Each application-specific protected data file can be associated with a set of authorized applications that are permitted to access that protected data file.

Each application-specific protected data file can be associated with a file-specific set of applications. The file-specific set of applications can include at least one of the applications 102 installed on the computing system 100. A requesting process may be permitted to access a requested application-specific protected data file only if the associated application associated with the requesting process is one of the file-specific set of applications associated with the requested data file. The file-specific set of applications for a given protected data file may be included in the application-specific access data for that protected data file.

In some cases, each file generated by a particular protected application can be associated with the application identifier of that application. The application identifier associated with the protected data file may be used to limit access to that protected data file to processes associated with other applications. For instance, a data file associated with a particular application identifier may be accessible only by processes associated with that same application identifier (e.g. with the exception of a root process).

In some cases, the file-specific set of applications associated with the protected data file may be associated with additional applications. For example, when creating a new file via APIs such as getSharedPreferences(String, int), openFileOutput(String, int), the application can be configured to use the MODE_WORLD_READABLE and MODE_WORLD_RITEABLE flags to allow other applications to read/write the protected data file simultaneously and/or separately.

The protected data files may include encrypted protected data files. The encrypted protected data files can be stored in the non-volatile storage 109 in an encrypted/cyphertext form. This may help prevent unauthorized processes from reading any of the plaintext data of the protected data file. The file content of each encrypted data file can be protected through an encryption process. The corresponding encryption keys can be managed by the TA 115 in the TEE 150.

Each encrypted protected file can be encrypted using a file-specific encryption key. The computer system 100 can be configured to associate file-specific file access data with each encrypted protected file. As described above, the file access data can include key material that specifies the file encryption key information for the corresponding encryption/decryption key for that file. The key material can be used to identify the encryption/decryption key corresponding to that encrypted data file. In some cases, the key material may be usable to derive the encryption/decryption key corresponding to that encrypted data file.

The file access data may be generated by the trusted application 115 in the TEE 150. The file access data can be stored in the non-volatile storage 109 in association with the corresponding encrypted data file. For example, the file access data may be stored in the non-volatile storage 109 through the file system 108 as an extended file attribute.

In some cases, the file attribute may also provide additional data related to the encrypted data file. For example, the file attribute can define a label that provides an indication that the corresponding file is a protected data file. In some cases, the protected file label may be included as part of the file access data. Alternately, the protected file label may be provided separate from the file access data. This may facilitate determining that the file is a protected data file, for instance where the file access data is encrypted.

As described above, the protected data files can include one or more encrypted data files. For each encrypted data file, the corresponding file encryption key can be generated in the TEE 150. Key derivation data (i.e. the file access data) can be stored in association with that encrypted data file, e.g. as an extended attribute. The file access data can also include the application identifier of the application associated with that protected data file.

In some cases, the file access data may also be encrypted, e.g. using user code data as an attribute encryption key. This can ensure that the key derivation data is secured through the trusted application 115 based on a user code defined by user 101. This allows the user 101 to protect the content of the protected data file and manage access to that protected data file, e.g. through the use of the user code.

Method of Initiating an Application

The following is a description of a method of initiating an application that may be used by itself in any access control system or method, or in any combination or sub-combination with any other feature or features disclosed including the system architecture, the user code, the application identifier, the application token, the file access data, the method of adding an application to a protected zone, the method of authenticating a process, the method of authorizing a process to access a data file, the protected data files, the method of generating a new protected data file, and the method of accessing a protected data file.

Computer system 100 can provide an application initiation (e.g. App start) method that may facilitate cryptographically secure access control. When a user initiates an application 102, a corresponding application process can be initiated. For example, in a computing system 100 operating using an Android™ operating system, the new application process be forked from the zygote process. The zygote process is a special system process within the Android™ operating system that may effectively provide a template for application processes that are initiated.

Upon initiation of the first process associated with a particular application, the computer system 100 can validate the application certificate corresponding to that associated application.

After the certificate is verified the computer system 100 can determine whether the user code is available within the trusted execution environment 150. The computer system 100 may determine whether the user code is available before the application classes are loaded and executed.

In some cases, the computer system 100 may generate a validated application initiation prompt in response to validating the application certificate. The validated application initiation prompt can be defined to prompt a user 101 to provide a user code input.

The computer system 100 may then receive a validated application initiation input (e.g. a user code input that defines a purported user code) in response to the validated application initiation prompt. The computer system 100 can then determine whether the validated application initiation input corresponds to the valid user code using the various processes described herein. For example, the control gate 104 may determine a hashed version of the user code input. The hashed version of the user code input can be provided to the kernel module 106 through the control gate 104 in the framework 130, and verified in the TEE 150.

If verification of the user code fails, the process initiation procedure can be terminated. If the verification of the user code is successful, the application (and corresponding process(es)) can be permitted to execute. The application (and corresponding process(es)) may be permitted to execute only after the application certificate has been validated and the computer system 100 determines that the validated application initiation input corresponds to the valid user code.

When the verification of the user code is successful, the computer system 100 can conduct further operations to establish the chain of trust between the user 101 and the trusted execution environment 150. For example, as described herein, the application token can be determined for the corresponding application. The application token can be determined at the control gate 104 and transmitted to the kernel module 106. The kernel module 106 can then transmit the application token to the trusted execution environment 150 as described above. An example process for verifying the application token and managing application operations using the application token is described in further detail in U.S. patent application Ser. No. 16/521,945 entitled "Personalized Cryptographically Secure Access Control in Trusted Execution Environment" the entirety of which is incorporated herein by reference.

The computer system 100 can also include the process identifier of the current process in the authorized process data structure maintained in the kernel memory by the kernel module 106 as a whitelist of all authorized processes. The current process may then be authorized to access some, or all, of the protected files stored in the non-volatile storage 109.

In some cases, the computer system 100 may only require the user code prior to application execution if the application is one of the protected applications. The computer system 100 may thus determine whether the associated application is one of the protected applications once the application certificate has been validated. If the associated application is a protected application, the computer system 100 may then determine whether the user code is available.

The computer system 100 can determine whether the associated application is one of the protected applications by determining the unique application identifier of the associated application. The computer system 100 can then determine whether the unique application identifier of the associated application is included in the access policy data structure stored by the kernel module 106. The control gate 104 may compute the application identifier of the corresponding application and check for the application identifier in the access policy data structure data structure maintained in the kernel memory by the kernel module 106.

If the application identifier of the associated application is not included in the access policy data structure, the computer system 100 may determine that the associated application is an unprotected application. Upon determining that the associated application is an unprotected application, the computer system 100 may permit the associated application to execute even in the absence of the user code. The unprotected application may still be prevented from accessing protected data files, whether or not the user code is available, using the processes described herein.

When the unique application identifier of the associated application is included in the access policy data structure, the computer system 100 can determine that the associated application is one of the protected application. The control gate 104 may then determine whether the user code is available within the computing system 100.

In some cases, the control gate 104 may prompt the end user 101 to enter the user code, either directly or indirectly, as described herein. Upon determining that the associated application is one of the protected applications, the control gate 104 may generate a protected application initiation prompt. The validated application initiation prompt can be defined to prompt the user 101 to provide a user code input.

The computer system 100 may then receive a protected application initiation input (e.g. a user code input) in response to the protected application initiation prompt. The computer system 100 may determine whether the protected application initiation input corresponds to the valid user code, e.g. by comparing a hashed version of the user code input with a stored hashed version of the user code. The computer system 100 may permit the associated application to execute only after the processor has determined that the protected application initiation input corresponds to the valid user code.

Creating a Protected File

The following is a description of a method of generating a new protected data file that may be used by itself in any access control system or method, or in any combination or sub-combination with any other feature or features disclosed including the system architecture, the user code, the application identifier, the application token, the file access data, the method of adding an application to a protected zone, the method of authenticating a process, the method of authorizing a process to access a data file, the protected data files, the method of initiating an application, and the method of accessing a protected data file.

The computer system 100 can be configured to generate new protected data files. Each protected data file can be associated with a file-specific set of applications that are permitted to access that protected data file. In some cases, all the protected applications may be permitted to access a particular protected data file. In some cases, access to one or more protected data files may be limited to a subset of protected applications (and in some cases only a single application).

A protected data file can include a file attribute identifying that file as a protected data file. The file attribute may also include file access data. The file access data may include key material when the protected data file is an encrypted data. Portions of the file access data, such as the key material, can be generated in TEE 150 and sent back to the file system 108 and stored in the extended attribute domain in the non-volatile storage 109.

In some cases, a data file can be defined as a protected file when the data file is first generated. For example, the computer system 100 can be configured to, for each new file generated by one of the protected applications, automatically store that file as one of the protected data files. That is, new files created by an authorized process corresponding to a protected application can be automatically protected (i.e. generated as protected data file).

In some cases, a data file may be initially generated and/or stored as an unprotected data file. For example, an application may initially be an unprotected application. The data files generated by that application while unprotected may be stored in the non-volatile storage 109 as unprotected data file. The application may subsequently be identified as a protected application, e.g. by a user adding that application to the protected zone. In such cases, existing files corresponding to the application may be converted from unprotected data files to protected data files.

When an application is identified as a protected application, the computer system 100 may identify a set of existing data files corresponding to that particular application that are stored in the non-volatile storage memory 109. The computer system 100 may then modify each of the existing data files from an unprotected data file to become one of the protected data files. For instance, the enroll service 105 may operate to modify the data files from unprotected data files to protected data files.

As noted above, processes associated with protected applications can have their corresponding process identifier stored in an authorized process data structure in the kernel memory managed by the kernel module 106. In some cases, the kernel module 106 may also define an additional conversion process data structure (also referred to as a conversion_PID data structure) in the kernel memory. The conversion process data structure can be used to identify processes that can convert existing (unprotected) data files to their protected versions.

Prior to adding a process identifier to the conversion process data structure, the enroll service 105 can determine whether the user code is present in the TEE 150. As described above, this may involve prompting the user to provide a user code input. This may allow the end user 101 to define, using the enroll service 105, which process(es) is/are permitted to perform conversion operations.

In some cases, the kernel module 106 may receive a write operation request from a particular process operating in the rich operating system. The write operation may relate to a protected data file. The kernel module 106 can be configured to permit the write operation request to occur only if the authorized process data structure includes the process identifier of the particular process.

When a process operating in the rich operating system creates a new file, the computer system 100 can determine whether the process identifier is included in the conversion process data structure.

When the PID is located in the conversion process data structure, the computer system 100 can be configured to store the new file as a protected data file. If the computer system determines that the PID is not located in the conversion process data structure, the kernel module 106 can further check whether the PID exists in the authorized process data structure in the kernel memory. If the process identifier is included in the authorized process data structure, the computer system 100 can be configured to store the new file as a protected data file.

To store the new file as a protected data file, the kernel module 106 can transmit a request to the TEE 150 to generate an encryption key and file access data for the new file. The TEE 150 can generate a random file encryption key for the new file. The encryption key can be used to encrypt the file prior to storage in the non-volatile storage 109. The file access data can be provided to the kernel module 106 to be associated with the newly created file (e.g. as an extended attribute).

If the process identifier is not included in the conversion process data structure and the process identifier is not included in the authorized process data structure, the computer system 100 can be configured to store the new file as an unprotected data file. For instance, the file can be created without the corresponding extended attribute.

Accessing an Existing Protected Data File

The following is a description of a method of accessing a protected data file that may be used by itself in any access control system or method, or in any combination or sub-combination with any other feature or features disclosed including the system architecture, the user code, the application identifier, the application token, the file access data, the method of adding an application to a protected zone, the method of authenticating a process, the method of authorizing a process to access a data file, the protected data files, the method of initiating an application, and the method of generating a new protected data file.

The computer system 100 can manage whether requesting processes are permitted to access requested data files. For instance, where the requested data file is a protected data file, the computer system 100 can prevent a requesting process from accessing the protected data file unless the requesting process corresponds to a protected application.

The computer system 100 can define a set of protected applications. The set of protected applications can include at least one of the applications 102 installed on the computing device 100. The computer system 100 may then permit the requesting process to access the requested data file only if the associated application is one of the protected applications.

The computer system 100 may associate each protected data file with a file-specific set of application. The file-specific set of applications can include at least one application installed on the computing device. For instance, each protected data file can be associated with the application identifier of each application in the file-specific set of applications. The computer system 100 may only permit a requesting process to access the requested data file only if the application associated with the requesting process is one of the file-specific set of applications associated with the requested data file.

The process of accessing a requested data file can include initially evaluating the file attributes of the requested file.

For instance, the computer system 100 may determine whether the requested data file includes an extended attribute indicating that the requested data file is a protected data file, such as a protected file label. If the requested data file does not have a protected file attribute associated therewith (e.g. if the data file does not include any extended attribute), the computer system 100 can determine that the requested data file is not protected. The requesting process may then be provided with access to the requested data file.

If the computer system determines that the protected file attribute is associated with the requested data file, the computer system 100 can determine whether the requesting process is an authorized process. For example, the computer system 100 may determine whether the requesting process is an authorized process by determining whether the process identifier of the requesting process is included in a data structure stored in the kernel memory, such as the authorized process data structure and/or conversion process data structure. If the computer system determines that the requesting process is an authorized process, the requesting process can be permitted to access the requested data file.

In some cases, where the computer system 100 determines that the process identifier of the requesting process is included in the conversion process data structure, the requesting process may be provided with access to the requested data file directly. The requesting process may be provided with access to the requested data file without evaluating the application(s) associated with the requested data file. For instance, the remainder of the process authentication procedure may be bypassed and the kernel module 106 may transmit a request to the TEE 150 to obtain the file encryption key. The request can include the file access data (or at least a portion thereof, such as the key material) associated with the requested data file. In this process, the trusted application 115 may not verify whether the data file is associated with a particular application when the encryption file is provided to the kernel module 106.

Processes with process identifiers included in the conversion process data structure may be limited in the operations that can be performed using the file encryption key. For instance, these conversion processes may be limited to using the encryption key to encrypt files and/or write new protected data files (and not to decrypt data files). This may facilitate operation of the conversion process, as typically the conversion process may simply read a previously unprotected plaintext files and write that file to the non-volatile memory 109 as a protected data file in cypher-text format. Thus, the fact that the TA 115 does not check the application-specific access data (e.g. the file ownership data indicating the association between the file and one or more protected applications) does not introduce a security vulnerability. Additionally, as noted above, adding a process identifier to the conversion process data structure in the kernel memory can be protected through verification of the user code.

In some cases, where the computer system 100 determines that the process identifier of the requesting process is not included in the conversion process data structure, the computer system 100 may determine whether the process identifier of the requesting process is included in the authorized process data structure. If the process identifier of the requesting process is not included in the authorized process data structure, the requesting process can be prevented from performing any read operations and/or write operations related to protected files in the non-volatile storage 109.

If the process identifier of the requesting process is included in the authorized process data structure, the kernel module 106 may further evaluate whether the requesting process is permitted to access the specific requested file. For example, the computer system 100 may evaluate whether the requesting process is associated with an application that is also associated with the requested data file. The kernel module 106 may query the process mapping data structure in the kernel memory to determine the application identifier associated with the requesting process. The kernel module 106 can provide the application identifier of the application associated with the requesting process and the file access data (or a portion thereof) of the requested data file to the trusted application 115 in the trusted execution environment 150.

The trusted application 115 can compare the application identifier of the application associated with the requesting process to the application identifier(s) of the application(s) associated with the requested data file (e.g. as determined from the file access data) to determine whether the requesting process is permitted to access the requested data file. The trusted application 115 may only provide the kernel module 106 with the encryption key corresponding to the requested data file when the process' application identifier matches up with the application-specific access data (e.g. file owner information) contained in the file access data. Thus, each authorized process may be permitted to access files associated with the same application as the requesting process (and any other files identifying the associated application as a permitted application). Similarly, the authorized processes may be prevented from accessing protected files associated with other applications—i.e. protected files in which the file-specific set of applications does not include the application associated with the requesting process.

The computer system 100 can be configured to update the authorized process data structure and/or the conversion process data structure in the kernel memory based on the life span of processes operating in the rich operating system. The kernel module 106 can be configured to update the authorized process data structure and/or the conversion process data structure by monitoring the processes operating in the rich operating system.

The computer system 100 may detect termination of a terminating process operating in the rich operating system. The computer system 100 can update the process whitelists when authorized processes are terminated. The kernel module 106 may determine that the authorized process data structure includes the process identifier of the terminating process. The kernel module 106 may then update the authorized process data structure to remove the process identifier of the terminating process. The kernel module 106 may also update the process mapping data structure. This may allow the computer system 100 to re-use process identifiers as processes are initiated and terminated, while preventing erroneous authorization inheritance. That is, new processes can be prevented from inheriting a permission that was granted to an expired process that has used the same process identifier that is reused and assigned to the new process.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. In other instances, well-known methods, procedures and components have not been described in detail so as not to obscure the description of the embodiments Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. An access control system for a computing device, the access control system comprising:
   (a) a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment; and
   (b) a non-volatile storage memory configured to store a plurality of data files and a plurality of application instruction sets, wherein each application instruction set corresponds to an application installed on the computing device and each application is configured to operate within the rich operating system, and wherein the plurality of data files includes a plurality of protected data files;
   (c) wherein the processor is configured to:
      (i) receive a file request for a requested file stored in the non-volatile storage memory, wherein the requested file corresponds to one of the protected data files in the plurality of protected data files, and wherein the file request is received from a requesting process operating within the rich operating system;
      (ii) determine an associated application associated with the requesting process, wherein the associated application corresponds to one of the applications installed on the computing device;
      (iii) determine whether a validated application token is present for the associated application; and
      (iv) permit the requesting process to access the requested data file only if the validated application token is present and otherwise prevent the requesting process from accessing the requested data file; wherein
         the processor is configured to generate the validated application token for the associated application by:
            detecting initiation of a first process associated with the associated application;
            determining that a valid user code is available within the trusted execution environment; and
            generating the application token using the valid user code upon determining that the valid user code is available within the trusted execution environment.

2. The system of claim 1, wherein:
   (a) the processor is configured to:
      (i) generate an application initiation prompt in conjunction with the initiation of the first process, wherein the application initiation prompt is defined to prompt a user to input a user code;
      (ii) receive an application initiation input in response to the application initiation prompt;
      (iii) determine whether the application initiation input corresponds to the valid user code; and
      (iv) generate the application token using the user code upon determining that the application initiation input corresponds to the valid user code.

3. The system of claim 2, wherein:
   (a) determining whether the application initiation input corresponds to the valid user code comprises:
      (i) determining a received user code from the application initiation input;
      (ii) determining a hashed user code by hashing the received user code;
      (iii) comparing the hashed user code to a stored hashed user code stored within a trusted non-volatile storage memory of the trusted execution environment; and
      (iv) determining that the received user code corresponds to the valid user code when the hashed user code matches the stored hashed user code and otherwise determining that the received user code is invalid.

4. The system of claim 1, wherein:
   (a) the processor is configured to generate the application token by:
      (i) determining a time stamp corresponding to the initiation of the first process; and
      (ii) generating the application token using the time stamp and the valid user code.

5. The system of claim 1, wherein the processor is configured to:
   (a) associate each protected data file with a file-specific set of applications, wherein the file-specific set of applications includes at least one application installed on the computing device; and
   (b) permit the requesting process to access the requested data file only if the associated application associated with the requesting process is one of the file-specific set of applications associated with the requested data file.

6. The system of claim 1, wherein the processor is configured to:
   (a) define a set of protected applications, wherein the set of protected applications includes at least one of the applications installed on the computing device; and
   (b) permit the requesting process to access the requested data file only if the associated application is one of the protected applications.

7. The system of claim 6, wherein the processor is configured to, for each new file generated by one of the protected applications, automatically store that file as one of the protected data files.

8. The system of claim 1, wherein:
   (a) for each application installed on the computing device, the processor is configured to assign that application a unique application identifier, wherein the application identifier is defined using a unique application identification code that is defined by the processor and an application certificate corresponding to that application; and
   (b) the processor is configured to generate the application token for the associated application using the unique application identifier for the associated application and the valid user code.

9. The system of claim 8, wherein
   (a) for each application installed on the computing device, the processor is configured to define the application identifier by:
      (i) generating a hashed application certificate by hashing the application certificate corresponding to that application; and (ii) combining the application identification code and the hashed application certificate.

10. The system of claim 8, wherein the processor is configured to, upon initiation of the first process associated with the associated application,
    (a) validate the application certificate corresponding to that associated application;
    (b) generate a validated application initiation prompt in response to validating the application certificate, wherein the validated application initiation prompt is defined to prompt a user to input a user code;
    (c) receive a validated application initiation input in response to the validated application initiation prompt;
    (d) determine whether the validated application initiation input corresponds to the valid user code; and
    (e) permit the associated application to execute only after the application certificate has been validated and the validated application initiation input corresponds to the valid user code.

11. The system of claim 1, wherein the processor is configured to:
    (a) for each application installed on the computing device, assign that application a unique application identifier, wherein the application identifier is defined using a unique application identification code that is defined by the processor and an application certificate corresponding to that application;
    (b) define a set of protected applications, wherein the set of protected applications includes at least one of the applications installed on the computing device;
    (c) define an access policy file, wherein the access policy files includes the unique application identifier of each protected application in the set of protected applications;
    (d) store the access policy file in the non-volatile storage memory; and
    (e) permit the requesting process to access the requested data file only if the unique application identifier of the associated application is included in the access policy file.

12. The system of claim 11, wherein the processor is configured to:
    (a) store the access policy file in the non-volatile storage memory in association with a hashed code corresponding to the valid user code;
    (b) prevent modifications to the access policy file unless a policy modification input that corresponds to the valid user code is received and verified against the hashed code corresponding to the valid user code; and
    (c) permit read operations to be performed on the access policy file in the absence of the policy modification input.

13. The system of claim 11, wherein the processor is configured to:
    (a) define an access policy data structure in a kernel memory accessible within the rich operating system; and
    (b) synchronize the access policy data structure with the access policy file stored in the non-volatile storage memory such that the access policy data structure includes the unique application identifier of each protected application in the set of protected applications.

14. The system of claim 13, wherein the processor is configured to, upon initiation of the first process associated with the associated application,
    (a) validate the application certificate corresponding to the associated application;
    (b) upon validating the application certificate, determine whether the associated application is one of the protected applications by:
        (i) determining the unique application identifier of the associated application; and
        (ii) determining whether the unique application identifier of the associated application is included in the access policy data structure; and
        (iii) determining that the associated application is one of the protected application when the unique application identifier of the associated application is included in the access policy data structure, and otherwise determining that the associated application is an unprotected application;
    (c) upon determining that the associated application is one of the protected applications,
        (i) generate a protected application initiation prompt, wherein the protected application initiation prompt is defined to prompt a user to input a user code;
        (ii) receive a protected application initiation input in response to the protected application initiation prompt;
        (iii) determine whether the protected application initiation input corresponds to the valid user code; and
        (iv) permit the associated application to execute only after the processor has determined that the protected application initiation input corresponds to the valid user code; and
    (d) upon determining that the associated application is an unprotected application, permit the associated application to execute.

15. The system of claim 11, wherein the processor is configured to, upon initiation of the requesting process,
    (a) determine a process identifier associated with the requesting process;
    (b) validate the application certificate corresponding to the associated application;
    (c) upon validating the application certificate, determine whether the associated application is one of the protected applications;
    (d) upon determining that the associated application is one of the protected applications, generate a process initiation prompt, wherein the process initiation prompt is defined to prompt a user to input a user code;
    (e) receive a process initiation input in response to the process initiation prompt;
    (f) determine whether the process initiation input corresponds to the valid user code;
    (g) upon determining that the associated application is one of the protected applications and that the process initiation input corresponds to the valid user code, store the process identifier of the requesting process in an authorized process data structure in a kernel memory accessible within the rich operating system; and
    (h) permit the requesting process to access the requested data file only if the authorized process data structure includes the process identifier of the requesting process.

16. The system of claim 15, wherein the processor is configured to:
    (a) receive a write operation request from a particular process operating in the rich operating system, wherein the write operation request relates to a protected data file; and
    (b) permit the write operation request to occur only if the authorized process data structure includes the process identifier of the particular process.

17. The system of claim 15, wherein the processor is configured to:
   (a) detect termination of a terminating process operating in the rich operating system;
   (b) determine that the authorized process data structure includes the process identifier of the terminating process; and
   (c) update the authorized process data structure to remove the process identifier of the terminating process.

18. The system of claim 11, wherein the processor is configured to:
   (a) store the access policy file in the non-volatile storage memory in association with a hashed code corresponding to the valid user code;
   (b) receive a policy update input specifying a particular application to be added to the set of protected applications;
   (c) generate an update verification prompt in response to the policy update input, wherein the update verification prompt is defined to prompt a user to input a user code;
   (d) receive an update verification input in response to the update verification prompt;
   (e) determine whether the update verification input corresponds to the valid user code using the hashed code corresponding to the valid user code stored in association with the access policy file;
   (f) upon determining that the update verification input corresponds to the valid user code,
      (i) update the access policy file to include the particular application;
      (ii) identify a set of existing data files corresponding to that particular application that are stored in the non-volatile storage memory; and
      (iii) modify each of the existing data files from an unprotected data file to become one of the protected data files.

19. A method of controlling access to a plurality of data files stored in a non-volatile storage memory of a computing device, wherein the plurality of data files includes a plurality of protected data files, the method performed using a processor configured to operate a rich operating system in a rich execution environment and a trusted operating system in a trusted execution environment, the method comprising:
   (a) receiving, by the processor, a file request for a requested file stored in the non-volatile storage memory, wherein the requested file corresponds to one of the protected data files in the plurality of protected data files, and wherein the file request is received from a requesting process operating within the rich operating system;
   (b) determining, by the processor, an associated application associated with the requesting process, wherein the associated application corresponds to one of the applications installed on the computing device;
   (c) determining, by the processor, whether a validated application token is present for the associated application; and
   (d) permitting, by the processor, the requesting process to access the requested data file only if the validated application token is present and otherwise prevent the requesting process from accessing the requested data file;
   wherein
   the validated application token for the associated application is generated by the processor by:
      detecting initiation of a first process associated with the associated application;
      determining that a valid user code is available within the trusted execution environment; and
      generating the application token using the valid user code upon determining that the valid user code is available within the trusted execution environment.

20. A computer-readable medium having stored thereon non-transitory computer readable instructions for controlling access to a plurality of data files stored in a non-volatile storage memory of a computing device comprising a processor configured to operate a rich operating system in a rich execution environment and a trusted operating system in a trusted execution environment, wherein the plurality of data files includes a plurality of protected data files, wherein the instructions are defined to configure the processor to:
   (a) receive a file request for a requested file stored in the non-volatile storage memory, wherein the requested file corresponds to one of the protected data files in the plurality of protected data files, and wherein the file request is received from a requesting process operating within the rich operating system;
   (b) determine an associated application associated with the requesting process, wherein the associated application corresponds to one of the applications installed on the computing device;
   (c) determine whether a validated application token is present for the associated application; and
   (d) permit the requesting process to access the requested data file only if the validated application token is present and otherwise prevent the requesting process from accessing the requested data file;
   wherein
   the instructions are defined to configure the processor to generate the validated application token for the associated application by:
      detecting initiation of a first process associated with the associated application;
      determining that a valid user code is available within the trusted execution environment; and
      generating the application token using the valid user code upon determining that the valid user code is available within the trusted execution environment.

* * * * *